(12) United States Patent
Sastry

(10) Patent No.: US 11,947,502 B2
(45) Date of Patent: Apr. 2, 2024

(54) CONCURRENT ENUMERATION OF MULTIPLE HIERARCHIES IN A DATABASE ENVIRONMENT

(71) Applicant: SAP SE, Walldorf (DE)

(72) Inventor: Subramanya Sastry, Bangalore (IN)

(73) Assignee: SAP SE, Walldorf (DE)

( * ) Notice: Subject to any disclaimer, the term of this patent is extended or adjusted under 35 U.S.C. 154(b) by 489 days.

(21) Appl. No.: 17/034,661

(22) Filed: Sep. 28, 2020

(65) Prior Publication Data

US 2021/0011889 A1   Jan. 14, 2021

Related U.S. Application Data

(62) Division of application No. 15/624,539, filed on Jun. 15, 2017, now Pat. No. 10,824,603.

(51) Int. Cl.
*G06F 16/00* (2019.01)
*G06F 16/21* (2019.01)
*G06F 16/22* (2019.01)
*G06F 16/2455* (2019.01)

(52) U.S. Cl.
CPC ........ *G06F 16/211* (2019.01); *G06F 16/2246* (2019.01); *G06F 16/2455* (2019.01)

(58) Field of Classification Search
CPC . G06F 16/211; G06F 16/2246; G06F 16/2455
See application file for complete search history.

(56) References Cited

U.S. PATENT DOCUMENTS

| | | | |
|---|---|---|---|
| 6,910,044 B2 | 6/2005 | Weinberg et al. | |
| 7,251,637 B1 | 7/2007 | Caid et al. | |
| 7,584,213 B2 | 9/2009 | Liebich et al. | |
| 7,610,292 B2 | 10/2009 | Krieg | |
| 7,640,259 B2 | 12/2009 | Heger et al. | |
| 7,751,417 B2 | 7/2010 | Cherny et al. | |
| 8,078,642 B1 * | 12/2011 | Poutanen | G06F 16/9027 707/706 |

(Continued)

OTHER PUBLICATIONS

"SAP Demand Signal Management, Changes and New Features in SAP Demand Signal Management 3.0," SAP Help Portal, retrieved from https://help.sap.com/viewer/fa19ae1f68734d2883f33bd64cc9a3cd/3.0/en-US/3f44d04797744ab1a3a42ebb615fa036.html and https://help.sap.com/viewer/fa19ae1f68734d2883f33bd64cc9a3cd/3.0/en-US/6977f420b7754b9f8752bdc915a3e258.html, accessed on or before Apr. 7, 2017, 31 pages.

(Continued)

*Primary Examiner* — Paul Kim
(74) *Attorney, Agent, or Firm* — Klarquist Sparkman, LLP

(57) ABSTRACT

Methods and systems are disclosed for enumeration of trees in a database environment. Temporary copies of trees are stored in a database accelerator environment, for efficient access by software programs operating within the database layer. Multiple trees can be enumerated concurrently using level-by-level traversal. Nodes are assigned sortable indices through which a tree structure is maintained. Enumeration supports linking from a node of a parent tree to a child tree stored separately. Enumeration supports synthesizing child nodes in order to satisfy constraints on a parent node. Filtering and sorting are supported. The disclosed technology provides unexpectedly superior results, and can be applied in many fields. Variants are disclosed.

15 Claims, 12 Drawing Sheets

(56) References Cited

U.S. PATENT DOCUMENTS

| | | | |
|---|---|---|---|
| 8,135,665 | B2 | 3/2012 | Wilking et al. |
| 8,688,685 | B2 | 4/2014 | Qin et al. |
| 8,838,578 | B2 | 9/2014 | Yoon et al. |
| 8,869,020 | B2 | 10/2014 | Daga |
| 8,972,900 | B2 | 3/2015 | Rotshtein et al. |
| 9,110,969 | B2 | 8/2015 | Li et al. |
| 9,336,262 | B2 | 5/2016 | Lee et al. |
| 9,471,609 | B2 | 10/2016 | Kienzle |
| 9,495,475 | B2 | 11/2016 | Weinberg et al. |
| 9,613,055 | B2 | 4/2017 | Tyercha et al. |
| 2012/0197900 | A1* | 8/2012 | Mandre .................. G06F 16/283 707/743 |
| 2013/0132911 | A1* | 5/2013 | Rotshtein .............. G06F 16/838 715/854 |
| 2015/0293971 | A1* | 10/2015 | Will ........................ G06T 17/05 707/718 |
| 2015/0310066 | A1* | 10/2015 | Beavin .............. G06F 16/24542 707/716 |
| 2016/0034356 | A1* | 2/2016 | Aron .................... G06F 11/1435 707/649 |
| 2018/0225316 | A1* | 8/2018 | Boles .................. G06F 16/2246 |

OTHER PUBLICATIONS

Prakash, K. "Unleash the power of SAP HANA from your ABAP Custom Code-Accelerate your custom reports like never before—Optimize your custom code—Possible Approaches," SAP Blogs, published Jun. 27, 2014, retrieved from https://blogs.sap.com/2014/06/27/unleash-the-power-of-sap-hana-from-your-abap-custom-code-accelerate-your-custom-reports-like-never-before-optimize-your-custom-code/, accessed on or before Jun. 13, 2017, 10 pages.

Shen, Yang. "Open discussion on Parameter ENABLE_HANA_MDX in BPC 10.0/10.1," SAP Blogs, published Feb. 18, 2015, retrieved from https://blogs.sap.com/2015/02/18/open-discussion-on-parameter-enablehanamdx-in-bpc-100101, accessed on or before Jun. 13, 2017, 14 pages.

* cited by examiner

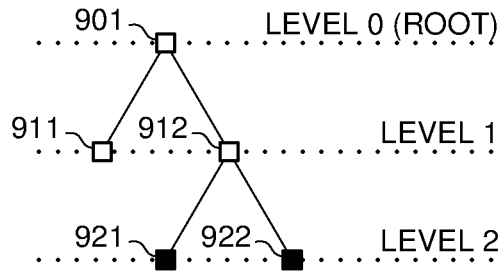
FIG. 9A
FLAG LEGEND:
001: SYNTHETIC NODE (SY)
010: LEAF NODE (L)
100: SPLIT NODE (SP)
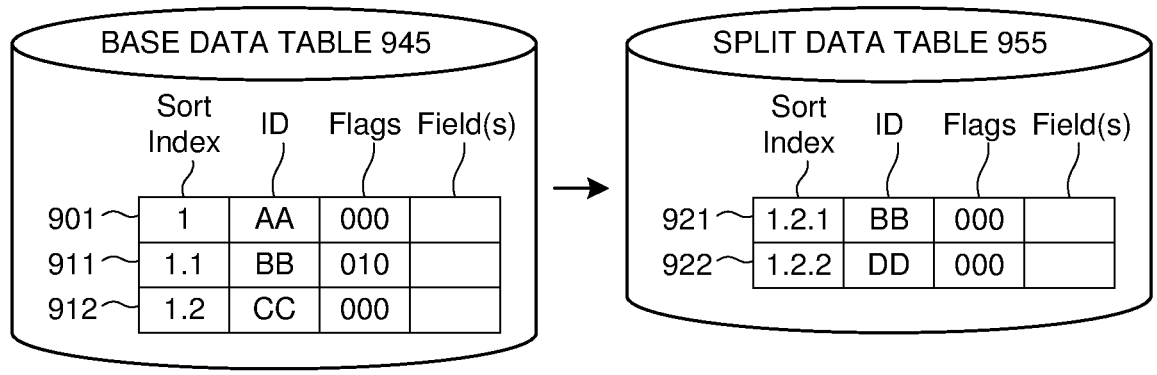
FIG. 9B
FIG. 9D
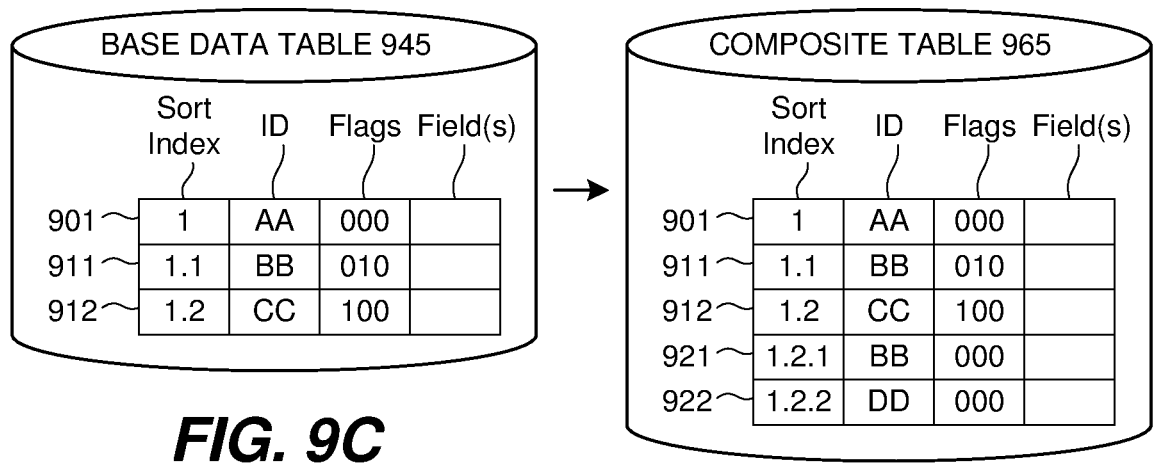
FIG. 9C
FIG. 9E

FLAG LEGEND:
001: SYNTHETIC NODE (SY)
010: LEAF NODE (L)
100: SPLIT NODE (SP)

FIG. 10A

| | Sort Index | Flags Field(s) |
|---|---|---|
| 801 | 1 | 000 |
| 802 | 2 | 000 |

FIG. 10B

| | Sort Index | Flags Field(s) |
|---|---|---|
| 801 | 1 | 000 |
| 802 | 2 | 000 |
| 811 | 1.1 | 010 |
| 813 | 1.2 | 000 |
| 815 | 1.3 | 000 |
| 812 | 2.1 | 100 |
| 814 | 2.2 | 000 |

FIG. 10C

| | Sort Index | Flags Field(s) |
|---|---|---|
| 801 | 1 | 000 |
| 802 | 2 | 000 |
| 811 | 1.1 | 010 |
| 813 | 1.2 | 000 |
| 815 | 1.3 | 000 |
| 812 | 2.1 | 100 |
| 814 | 2.2 | 000 |
| 821 | 1.2.1 | 100 |
| 823 | 1.2.2 | 000 |
| 825 | 1.2.3 | 000 |
| 827 | 1.3.1 | 000 |
| 820 | 2.1.1 | 000 |
| 822 | 2.1.2 | 010 |
| 824 | 2.1.3 | 000 |
| 826 | 2.2.1 | 000 |
| 828 | 2.2.2 | 001 |

FIG. 10D

| | Sort Index | Flags Field(s) |
|---|---|---|
| 802 | 2 | 000 |
| 812 | 2.1 | 100 |
| 814 | 2.2 | 000 |
| 820 | 2.1.1 | 000 |
| 822 | 2.1.2 | 010 |
| 824 | 2.1.3 | 000 |
| 826 | 2.2.1 | 001 |
| 828 | 2.2.2 | 000 |
| 832 | 2.1.1.1 | 010 |
| 834 | 2.1.1.2 | 000 |
| 836 | 2.1.3.1 | 010 |
| 838 | 2.1.3.2 | 010 |
| 842 | 2.2.1.1 | 000 |
| 844 | 2.2.1.2 | 010 |
| 846 | 2.2.1.3 | 001 |
| 848 | 2.2.2.1 | 001 |

FIG. 10E

| | Sort Index | Flags Field(s) |
|---|---|---|
| 802 | 2 | 000 |
| 812 | 2.1 | 100 |
| 820 | 2.1.1 | 000 |
| 832 | 2.1.1.1 | 000 |
| 834 | 2.1.1.2 | 000 |
| 822 | 2.1.2 | 010 |
| 824 | 2.1.3 | 000 |
| 836 | 2.1.3.1 | 010 |
| 838 | 2.1.3.2 | 010 |
| 814 | 2.2 | 000 |
| 826 | 2.2.1 | 000 |
| 842 | 2.2.1.1 | 010 |
| 844 | 2.2.1.2 | 000 |
| 846 | 2.2.1.3 | 001 |
| 828 | 2.2.2 | 001 |
| 848 | 2.2.2.1 | 001 |

CONCURRENT ENUMERATION OF MULTIPLE HIERARCHIES IN A DATABASE ENVIRONMENT

CROSS REFERENCE TO RELATED APPLICATIONS

This is a Divisional of U.S. patent application Ser. No. 15/624,539, filed Jun. 15, 2017, which application is incorporated herein by reference in its entirety.

BACKGROUND

Hierarchically organized data is found in many database environments. The scale of database deployments continues to increase in size, and enumeration of hierarchies can prove a performance bottleneck. There remains a continuing need for efficient technologies for enumerating hierarchies.

SUMMARY

In summary, the detailed description is directed to various innovative technologies for concurrent enumeration of multiple hierarchies.

In a first aspect, components of multiple primary tree structures within a database are enumerated. Components can be nodes of the trees, or parameters or values of the nodes or of objects contained within the nodes. A request to enumerate the components of the trees is received at a database accelerator. A first vector is obtained, representing a sequence of tree nodes at a first hierarchical level, from all of the multiple tree structures. The first vector is processed to obtain a second vector representing the tree nodes, from all of the multiple primary trees, at the next hierarchical level immediately below the first hierarchical level. The nodes of the second vector can be child nodes of the nodes of the first vector. As part of the enumeration process, the nodes of the first and second vectors can have respective sortable labels that define the position of an instant node within the multiple primary trees. The processing of the vectors of nodes can be repeated level-by-level, starting from the root node level and continuing until all leaf nodes have been enumerated. The level-by-level processing can result in an optimization of database fetches. One or more of the primary tree structures can be stored as a temporary structure within the database accelerator or within a database layer associated with the database accelerator; the temporary structure can be a copy of data received from a source database environment over a network connection.

In a second aspect, at least one parent node of the first vector, listed in a first primary tree, has a child node in the second vector that is not listed in the first primary tree. In examples, the parent node can have a reference to a child tree that is distinct from the first primary tree, in which the child node is listed. In examples, a child node can be synthesized to satisfy a constraint on the parent node, such as a total count, that is not satisfied by the existing child nodes of the parent node.

In another aspect, results of the enumeration can be gathered into one or more composite data structures, such as a respective composite structure for each of the multiple primary trees. In examples, updated parameters or values associated with one or more tree nodes can be received, and one or more composite data structures can be updated in response.

In another aspect, results from the enumeration can be returned to an application layer client. Returned results can include an entire composite data structure, or any subset of the enumerated tree nodes. Returned results can include requested parameters or functions of all nodes, of all leaf nodes, or of a specified subset of nodes, and can be gathered as an aggregate, or grouped by node type, or by another parameter of the tree nodes. By way of illustration, returned results can include a count of a particular node type, or a list of nodes having a specified value of a parameter, or the sum of another parameter grouped by node type.

In another aspect, an example database acceleration system is implemented on one or more computing stations comprising respective processors with attached memory and network adapters, the computing stations being interconnected by one or more network connections. The database acceleration system can include a configuration acquisition subsystem, a data acquisition subsystem, and a tree traversal engine. The configuration acquisition subsystem is configured to acquire configuration information into one or more database tables. The configuration information can include structure information of multiple primary trees, other tree configuration information, and configuration parameters related to an enumeration procedure. The data acquisition subsystem is configured to acquire a snapshot of data for one or more of the primary trees, or a stream of updates for parameters or values associated with the tree nodes. The tree traversal engine is connected to the configuration and/or data acquisition subsystems and is configured to perform concurrent traversal of the multiple primary trees, in a level-by-level manner. In examples, at least a part of the tree traversal engine is a software module contained within a database layer of a database environment. The tree traversal engine can be configured to optimize data fetches during an enumeration procedure. In example, the tree traversal engine, the configuration acquisition subsystem, and the data acquisition subsystem comprise instructions stored in computer-readable media and executed by one or more of the computing station processors.

Example database acceleration systems can also contain a compositing subsystem or a reporting subsystem. For primary tree nodes (parent nodes) having child nodes that are not listed in the primary tree but are listed in a referenced child tree, the compositing subsystem is configured to combine objects of a child tree with objects listed in a primary tree to form one or more composite data structures. The parent node can be a root node of the child tree and a lower level node of the primary tree. In other examples, child nodes are synthesized to satisfy a constraint on the parent node, and can likewise be integrated into the composite data structure. The reporting subsystem can be configured to transmit a composite data structure over a network connection to a computer-implemented client application. The reporting subsystem can be configured to gather one or more parameters from the composite structure into an output structure, and transmit the output structure over a network connection to a computer-implemented client computer.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 9A-9E are diagrams illustrating composition of base and split tables according to disclosed technologies.

FIGS. 10A-10E are diagrams illustrating enumeration of trees according to disclosed technologies.

DETAILED DESCRIPTION

Overview

Figure 1:
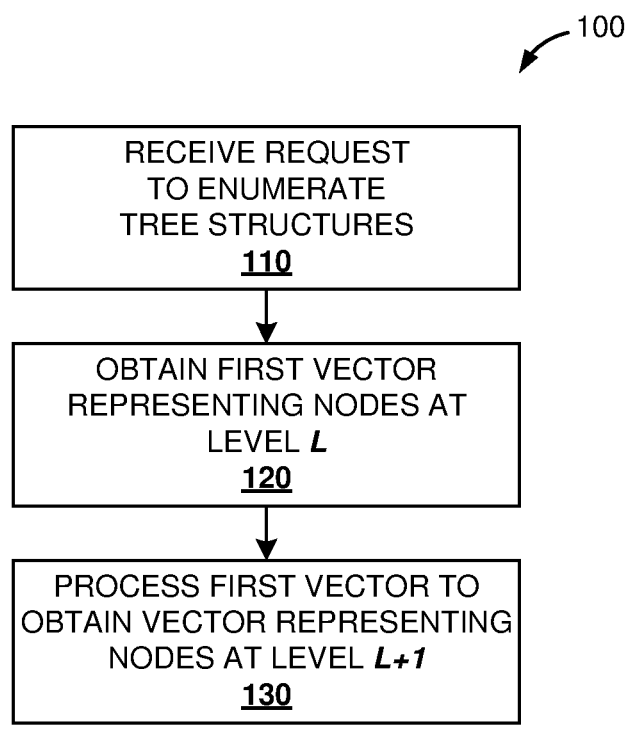
FIG. 1 is a flowchart depicting an example method according to disclosed technologies.

The disclosed technologies provide methods and systems for efficient enumeration of tree structures in a database environment. Trees can be used to represent hierarchically organized data, which is widely found in many fields. It is often desired to traverse one or more hierarchies, either to collect all nodes of the hierarchies, or nodes of particular types, or to evaluate parameters or functions on the collected nodes. Furthermore, a node of a first tree can be a reference to a second tree, for which enumeration involves embedding the nodes of the second tree into the enumeration of the first tree. Additionally, tree structures can be imperfect, and data can be missing, which can be addressed by synthesizing "dummy" nodes to maintain the integrity of the tree. Still further, as tree structures grow in size, it can be efficient to prune the traversal according to one or more specified filters. Any of these features can lead to relatively complicated data access patterns in a database environment, which can lead to a performance bottleneck.

The disclosed technologies can address such problems. By providing performance improvements for tree enumeration, and supporting a variety of features and requirements, the disclosed technologies provide a significant improvement to the art of computer-implemented databases.

Among other features, the disclosed technologies provide for pushing software code down to the database layer, for performing level-by-level traversal of multiple trees concurrently, for supporting importation of one tree into another, for supporting synthesis of child nodes where necessary, for checking tree structural errors on the fly, and/or for applying filters. The disclosed technologies can optimize data fetches and data access patterns. As described below, the disclosed technologies have been demonstrated to provide unexpectedly superior results. These improvements in computer-implemented database technology are applicable across many fields.

Terminology

As used in this disclosure, a "tree" can be a hierarchical data structure of nodes having one root node. Nodes can be organized into "levels" according to their distance from the root node. For convenience and without loss of generality, the root node can be considered level 0, and succeeding levels can be designated 1, 2, 3, . . . . Commonly, the root node can be visualized at the top of the tree, and other nodes of the tree can be described as being "below" the root node, so that level 1 can be below level 0; level 2 can be below both levels 0 and 1, and so on. A node at level L has a unique "parent" node at level L-1 to which it is linked in the tree hierarchy, and can have zero or more "child" nodes at level L+1. A node with no child nodes can be termed a "leaf" node. A "node" can be a data item that is a member of a tree. A node can be atomic or can include a data structure. A node can represent a software object, a physical object, or a class of objects.

As used in this disclosure, the terms "traverse" and "enumerate" can be applied to similar tree operations. "Traversal" refers to the operations of traveling from node to node along parent-child connections or sibling-to-sibling connections so as to reach every node of the tree or, sometimes, every node of a desired subset of a tree. Because traversal refers to the traveling operations, a traversal need not have any output. "Enumeration" refers to a traversal of a tree that generates an output. The output could be a simple count of tree nodes, a sum or summary of specified node parameters, a dictionary of node labels, or even a full representation of the tree or a portion of the tree. Wherever words stemming from "traverse" are used in this disclosure, it is understood that an enumeration can be included within the scope of operations. Where enumerations are described that result in a complete set of tree nodes, it is understood that alternate enumeration functions or outputs can be included within the scope of the description.

Sometimes, one tree could be linked to another tree. For example, one node of a parent XML document can link to a child XML document containing its own tree of nodes. The linking node of the parent tree is dubbed a "split node," and the child object is dubbed a "child tree," which can be represented in a table called a "split table." The child nodes of the split node thus are not described or listed within the parent tree, but can be described or listed separately within the child tree. Nevertheless the child nodes of the split node can be included when the parent tree is traversed.

In examples of the disclosed technologies, multiple trees can be traversed together. The original set of trees being traversed, before any split nodes or child trees are encountered are designated "primary" trees. During traversal, the number of trees being traversed can go up or down, as child trees are added or trees are "exhausted" (when all their leaf nodes have been traversed).

As used in this description, a "table" is a two-dimensional array organized into rows (records) and columns (fields). A table can be a database table used to store application data, configuration data, metadata, or working data. In examples, a table can be a row store table accessed through an associated index structure or a column store table.

Example Method

FIG. 1 is a flowchart 100 depicting an example method according to disclosed technologies. At process block 110, a request is received to enumerate a plurality of tree structures. At process block 120, a first vector is obtained representing nodes at a level L. At process block 130, the first vector can be processed to obtain a second vector representing nodes at level L+1. In examples, the first or second vector can contain one or more parameters of each represented node; the parameters can include a pointer to a node, a node identifier, a sortable label, an index, and/or other parameters, and can include the entire node content. For convenience, expressions such as "vector of nodes" are used to mean a vector representing the nodes, and nodes are described as being included within a vector, even where the vector contains less than the entire node content.

In examples, process blocks 120 and 130 can be repeated until all levels of the tree structures have been traversed. On a first iteration, process block can begin at level L=0 representing the root nodes for multiple tree structures. In examples, special handling of certain nodes of the first vector can be performed. In some examples, a node at a level L>1 of a parent tree can be the root node of a separate child tree, and processing at process block 120 can include importation of nodes from one or more child trees into the level L+1 vector. In examples, a parent node at level L can have one or more constraints that are not satisfied by its child node(s), and processing at process block 120 can include synthesizing a child node having one or more parameters selected to satisfy the parent node constraints. In examples, processing can include error checking, for example, a check that a tree path is not recursive or endless.

Second Example Method

Figure 2:
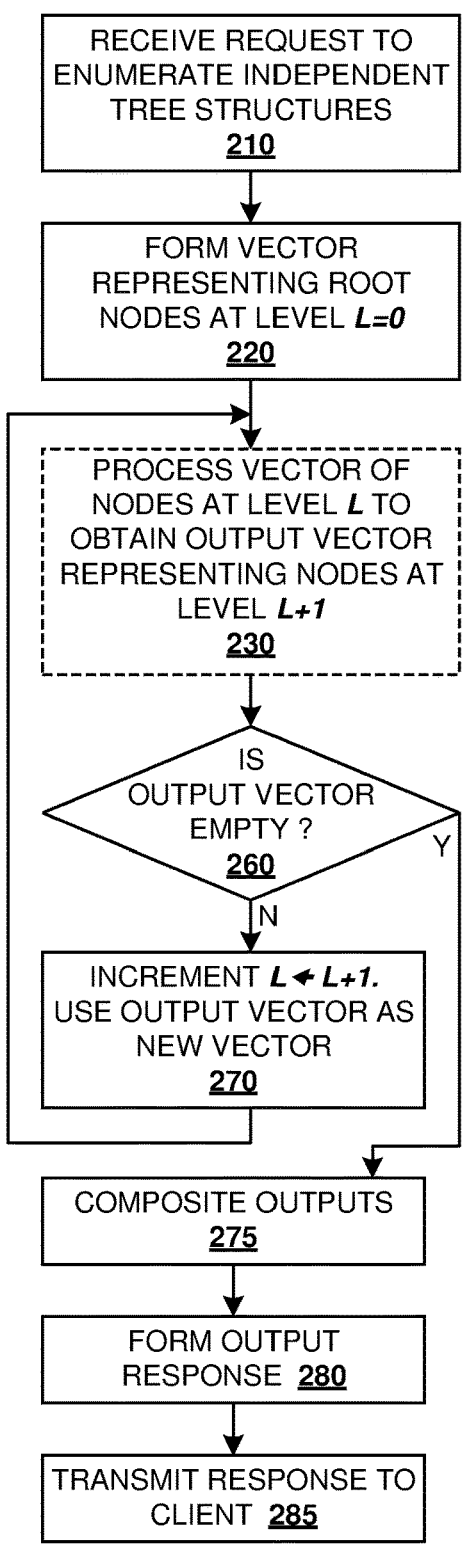
FIG. 2 is a flowchart depicting a second example method according to disclosed technologies.

FIG. 2 is a flowchart 200 depicting a second example method according to disclosed technologies. The second method performs a loop over hierarchical levels of one more trees, beginning at the root node and continuing until all nodes have been enumerated.

At process block 210, a request is received to traverse and enumerate a plurality of primary or independent tree structures. In examples, the request can contain one or more fields indicating the trees to be traversed by name, pointer, address, or other reference. Responsive to the request, the method starts at process block 220 from the root nodes of the independent tree structures, building a vector representing the root nodes of the plurality of trees to be traversed. The root node level is denoted as L=0. Because each tree has one node at its root level, the vector of nodes for L=0 has a length equal to the number of primary trees.

At process block 230, the vector of nodes at a current level L becomes an input vector for processing, which can be processed to obtain an output vector representing the nodes at level L+1, across all trees currently being traversed. Each node of the output vector has a parent node represented in the input vector. Each parent node can have zero, one, or multiple child nodes. The number of nodes represented in the output vector can be greater than, the same, or less than the number in the input vector. If all nodes of the output vector are leaf nodes, then there are no child nodes, and the output vector can be an empty vector with length zero. Furthermore, the number of trees represented in the output vector, can be greater than, the same, or less than the number of trees represented in the input vector. The number of trees can diminish as trees exhaust all their leaf nodes; the number of trees can increase as nodes link to external subtrees, as described herein. Exemplary details of the processing at 230 are described further in connection with FIG. 3.

Proceeding to process block 260, a check can be made whether the output vector is empty. If yes, then the Y branch can be followed to 275. Otherwise, the N branch leads to process block 270, where L can be incremented and the output vector becomes the new input vector for the incremented level. The method then loops back to 230 to process the incremented level.

Proceeding in this loop, eventually all levels of all processed trees are exhausted, a zero length output vector is obtained, and the method exits the loop to process block 275. At optional process block 275, any separate portions of the enumerated trees can be composited to form one or more composite structures representing the fully enumerated independent trees. Then, at optional process block 280, nodes or node parameters can be gathered according to configuration information to prepare a response, which can be returned to an application layer at process block 285, completing the method. In examples, the response can be transmitted over a network to a client application hosted on a client computer.

Third Example Method

Figure 3:
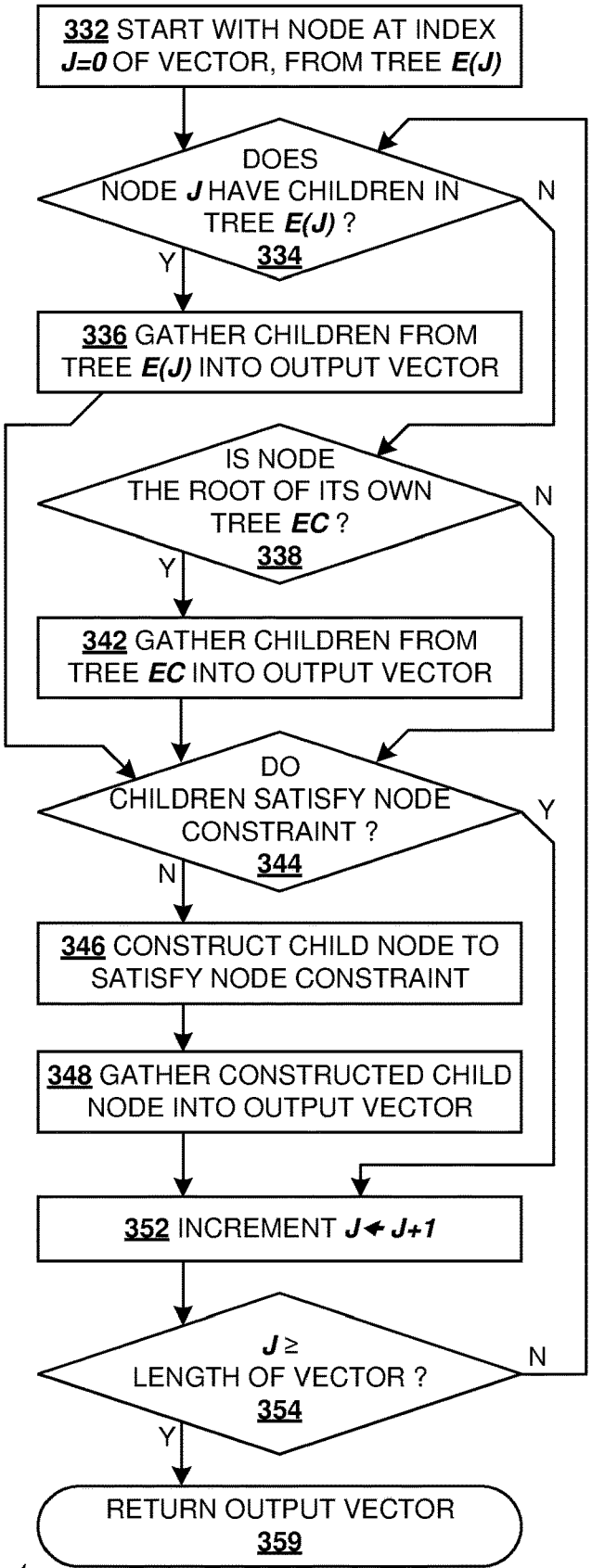
FIG. 3 is a flowchart depicting a third example method according to disclosed technologies.

FIG. 3 is a flowchart 300 depicting a third example method according to disclosed technologies. The third method describes processing an input vector at level L to obtain an output vector at level L+1, as an example of the processing previously described at process blocks 130 or 230. In this method, nodes in the input vector can be designated by an index J, and can be processed successively to build an output vector of their child nodes.

The method begins at process block 332, where index J is initialized to zero. An empty output vector can also be initialized, with its own index. Because the vector can include nodes belonging to different trees, the quantity E(J) is introduced to denote the tree E of which the $J^{th}$ node is a part. At decision block 334, a determination can be made whether node J has one or more children in tree T(J). If yes, the method follows the Y branch to process block 336, where these children can be gathered and collected in the output vector, the index of which can be incremented according to the number of children. If no, the method follows the N branch from decision block 334 to decision block 338, where a determination can be made whether node J is a split node having its own separate subtree EC, which should be embedded at the location of parent node J for enumeration. If yes, the method follows the Y branch to process block 342, where children of node J can be gathered from external tree EC and collected into the output vector. If no, then the method follows the N branch from decision block 338 to decision block 344. The method branches from process blocks 336 and 342 also converge at decision block 344.

At decision block 344, a determination can be made whether the children of node J satisfy a constraint on node J. If the constraint is satisfied, the method follows the Y branch to process block 352. If the constraint is not satisfied, then the method proceeds to block 346 where a child node can be constructed having one or more parameters chosen to ensure that the constraint on node J is satisfied. By way of illustration, each node in a tree can have a count, and a parent node can be constrained such that it should have a count equal to the sum of all counts of its children. Thus, if a parent node has a count of 10, and its children, gathered at either process block 336 or 342, have respective counts of 2, 3, and 4, then the sum of child nodes' counts is 2+3+4=9, and the constraint has a shortfall of one count. In this situation, a child node having count=1 can be synthesized at process block 346. At process block 348, the child node can be placed in the output vector and the index of the output vector increased by one. Thereafter, the method proceeds to process block 352.

Nodes can have multiple constraints, or non-numeric constraints. In examples, a synthesized child node can take on a non-physical value. In the example above, if the parent node had a count of 8 instead of 10, then the children nodes' count would be too high by one, and a synthesized node would have count of minus one, which could be non-physical. In such cases an alert message can be generated, or a warning flag can be embedded within the parent node and/or the synthesized child node. Furthermore, different examples can handle the case of a childless node with an unsatisfied constraint in different ways. One of ordinary skill will appreciate that generation of synthesized child nodes at successive levels could continue indefinitely if unchecked. In examples, constraints can be applied differently to leaf nodes and non-leaf nodes. In such examples, the childless parent node having an unsatisfied constraint can be artificially marked as a leaf node instead of synthesizing a child node. Alternatively, the childless parent can be left untouched, and a synthesized child node can be marked to be a leaf node so as to terminate its branch of the tree.

At process block 352, node index J can be incremented in order to process the next node in the input vector. A check can be made at decision block 354 whether J is greater than or equal to the length of the input vector. In the illustrated example, 0-based indexing is used for the input vector, which means that the maximum valid index J can be one less than the length of the vector. If the length of the input vector is 10, then valid values of J are 0 to 9. Thus, if J reaches or exceeds 10, it is not a valid index into the input vector and the processing of the input vector is complete. In this case, the method proceeds to process block 359, and the output vector can be returned for continued processing.

One of ordinary skill will recognize that numerous variations are possible. In examples, there could be no constraints, and process blocks 344, 346, 348 can be omitted, while in other examples, there could be no auxiliary trees to be incorporated into a parent tree, and process blocks 338, 342 can be omitted. In examples, a method similar to flowchart 300 can incorporate additional processing steps, such as application of filters, to limit the child nodes that are collected in the output vector, or performance of inline functions such as keeping a total count of certain parameter values or patterns. Loop and index management can be done with decrementing indices, with 1-based indexing, and with alternative forms of a loop termination condition.

Example Environment

Figure 4:
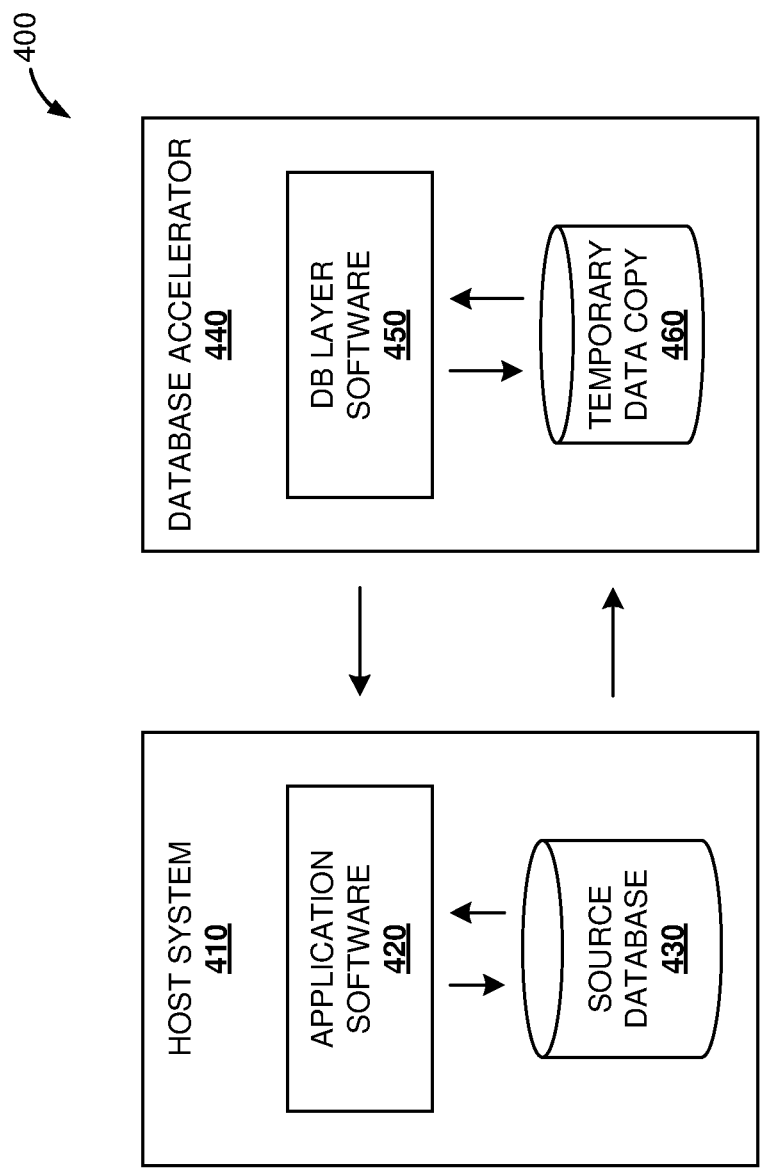
FIG. 4 is a first block diagram of a system and environment according to disclosed technologies.

FIG. 4 is a block diagram 400 of a system and environment according to disclosed technologies. Host system 410 is a database environment incorporating application software 420 in communication with a source database 430. Database accelerator 440 is a database environment incorporating software 450 within the database layer and a data store 460 containing temporary tables, trees, views, indexes, or other data structures containing at least some data items copied from source database 430. The database layer software 450 can provide efficient, fast processing, within the database layer, with or on the temporary data store 460. Results of the database layer processing can be returned to a client within application software 420. Thus, an acceleration advantage can be provided for tree enumeration and other operations compared to the performance available if the processing was performed within the host system environment 410.

In examples, the temporary data copy 460 can be implemented as an in-memory column store database such as an SAP HANA® database system. In examples, communication between host system 410 and database accelerator 440 can be performed through respective network adapters and over a network connection. In examples, communication between application software 420 and source database 430 can be performed through respective network adapters and over a network connection. In some examples, communication between database layer software 450 and temporary data store 460 can be performed through one or more of bus adapters, memory controllers, busses, and can be performed without a network adapter or a network connection. In other examples, communication between database layer software 450 and temporary data store 460 can be performed through respective network adapters and over a network connection.

Example Architecture

Figure 5:
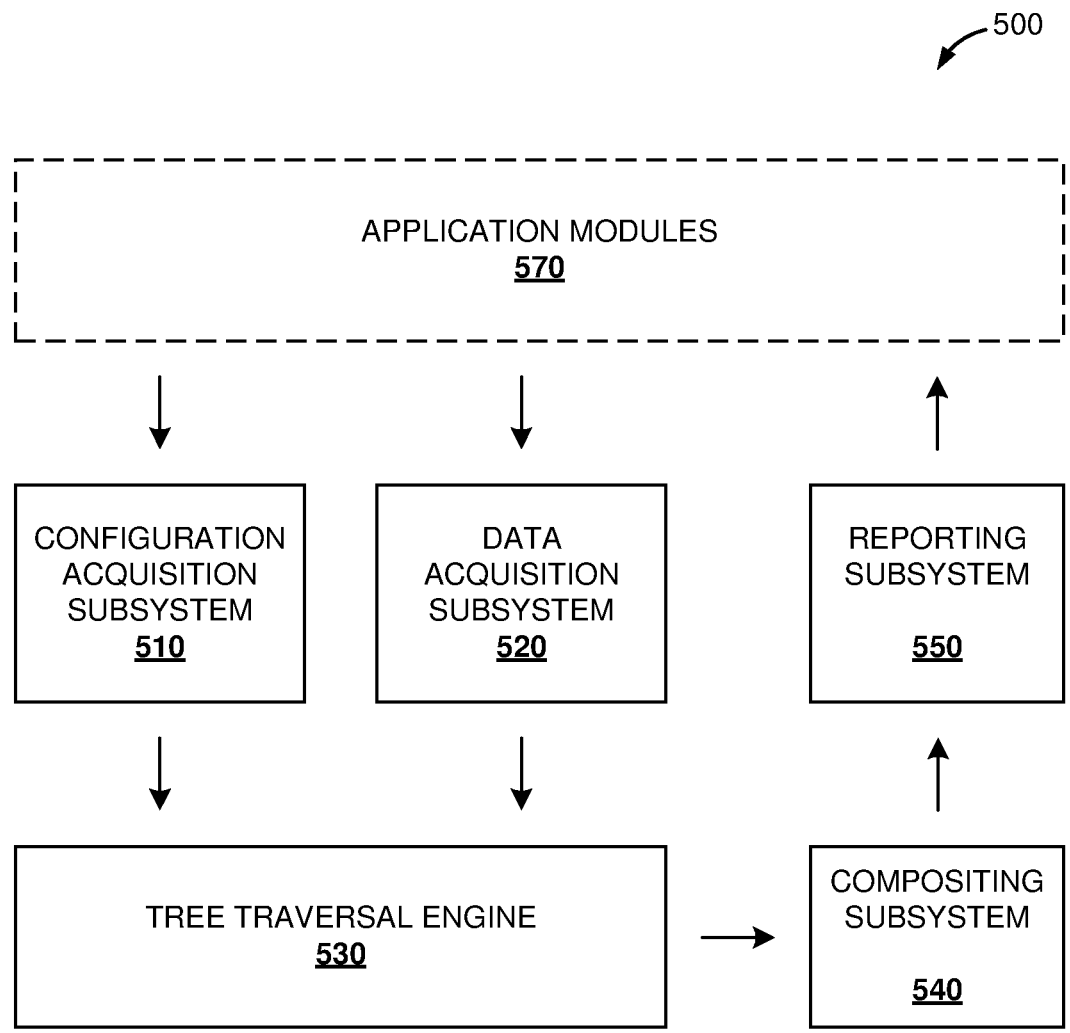
FIG. 5 is a second block diagram of a system and environment according to disclosed technologies.

FIG. 5 is a block diagram of a system and environment 500 according to disclosed technologies. The system comprises various processing blocks 510-550 that receive one or more inputs from one or more data sources or software modules in an application layer 570, and provide processed output to one or more data sinks or software modules in the application layer 570. The discussion below follows the flow of data, from tree and other information received by acquisition subsystems 510, 520, via enumeration of trees by tree traversal engine 530, to post-processing and output by subsystems 540, 550.

In order to process one or more trees, tree traversal engine 530 can consider the structure of the trees, the data values of the tree nodes, and optionally additional configuration information. In examples, configuration acquisition subsystem 510 receives configuration and/or structure information from application layer 570. The structure information can define the topology of trees to be enumerated, with edge connectivity between tree nodes, and optionally labels, node counts, and/or other node or tree parameters. The additional configuration information can include node constraints, filters, information about subtrees to be linked into a parent tree, access or authorization information, desired output reporting, and/or other configuration parameters. In examples, the structure and/or configuration information can be acquired from one or more of: a host database system, a host application environment, a file such as a fixed format file or a flat file, a user interface, over a network connection, or from other sources. Structure and/or configuration information can be provided to configuration acquisition subsystem 510 by a push method, by a call from an application module to an exposed API (application programming interface) function, using polling by configuration acquisition subsystem 510, by a query/response method, by a publish/subscribe method, or by another technique. A combination of data sources and/or a combination of delivery techniques can be used. After processing, the configuration and/or structure information can be provided to the tree traversal engine 530. In examples, the configuration and/or structure information can be stored in one or more internal data stores in one or more tables or other data structures, in one or more formats compatible with input settings of the tree traversal engine 530. The structure and/or configuration information can be initialized or updated one or more times over the lifetimes of the trees, or the lifetimes of the components of system 500. In examples, updates can provide complete information of one or more trees, or can provide partial information. Partial updates can be provided in the form of a change log, in the form of a single tree, or as a subtree.

In examples, the values or parameters associated with tree nodes can be provided to data acquisition subsystem 520, and can be provided separately from the structure and/or configuration information previously discussed. In some examples, tree node data can be updated on a periodic basis, for example, hourly, daily, weekly, quarterly, monthly, annually, or at any other suitable interval, while in other examples the updates can be provided on an event-driven basis. The values or parameters can include a single value for each node, multiple values or one or more data structures for each node, or a combination thereof. The values provided to data acquisition subsystem 520 can include complete values for all trees, complete values for a subset of one or more trees, complete values for subtrees, a change record containing values for only changed nodes of one or more trees, or any combination thereof. In examples, the values provided to data acquisition subsystem 520 can be a stream of data values generated based on external events. Tree node data can be received from a variety of data sources, over a variety of connections, and using a variety of delivery methods similar to those described above in context of configuration acquisition subsystem 510. The data sources, connections, and methods used to provide tree node data to data acquisition subsystem 520 can be the same or different as those used to provide configuration and/or structure information to configuration acquisition subsystem 510. After processing, the tree node data can be provided to the tree traversal engine 530. In examples, the tree node data can be stored in one or more internal data stores in one or more tables or other data structures, in one or more formats compatible with input settings of the tree traversal engine 530.

Tree traversal engine 530 builds a representation of the trees to be traversed, and performs collective enumeration of one or more trees, level by level as described herein. In examples, at least parts of tree traversal engine 530 can be implemented within a database layer, for example, in a database accelerator similar to 440 of FIG. 4.

In examples, the tree enumeration could involve child nodes that are not present within the tree being traversed. In some examples, the child nodes can be imported from other trees, while in other examples, a child node can be synthesized, for example, to satisfy a constraint or to replace a missing data value. In some examples, the output of the tree traversal engine 530 can include a structure (in some examples, referred to as a split table) that can be merged into the processed nodes of the original trees. In other examples, the imported or synthesized nodes can be incorporated into vectors during level by level traversal, and no subsequent merging is performed.

Optional compositing subsystem 540 merges a split table (or, other auxiliary structure) with an original structure of one or more trees, to generate a composite table, which can be maintained in an internal store for access by the reporting subsystem 550. In other examples, a compositing subsystem 540 can merge data values from a stream of data (or other incremental data) into an existing composite table.

Reporting subsystem 550 can generate responses that can be provided or returned to components in the host or application layer 570. In varying examples, responses can include one or more fully enumerated trees, a collection of leaf nodes of one or more trees, or parameters gathered by collecting parameters or values by node or node type. Responses can be filtered or sorted as specified by configuration parameters. Responses can be pushed to the application layer, provided in response to an application call providing, e.g., data values to data acquisition subsystem 520, or provided in response to particular requests from an application layer component to the reporting subsystem 550. By way of illustration, provision of tree node data to data acquisition subsystem 520 can automatically lead to processing by tree traversal engine 530, compositing by compositing subsystem 540, and reporting of a complete composite table by reporting subsystem 550 in response to the tree node data being provided. Then, at a later time, an application layer client can request a particular filtered node summary from the reporting subsystem 550, and the response can be prepared and returned to the requesting client by reporting subsystem 550. In examples, functionality can be redistributed between reporting subsystem 550 and compositing subsystem 540.

By way of illustration, a hierarchical XML document can contain records (tree nodes) marked "expired." Some document nodes can be links to other XML documents, and all nodes can have an associated page count. Exemplary reporting functions could be to count all expired nodes, or to produce a list of expired nodes, or to count the total numbers of page for all expired and unexpired nodes (by summing the individual node page counts) for each of the two groups. As used in this description, "gathering" parameters or nodes can include collecting the parameters or nodes into a set, and can also include aggregating the parameters into a single value or object, for example, by summing counts.

Many variations are possible, providing similar or equivalent functionality and similar advantages. For example, configuration acquisition subsystem 510 and data acquisition subsystem 520 can be combined into a single subsystem, or can have their functions reorganized within two or more subsystems. In examples, configuration acquisition subsystem 510 can be omitted, and the configuration or structure of trees to be enumerated can be embedded within or inferred from the data provided to data acquisition subsystem 520. In examples, the functions of compositing subsystem 540 can be integrated within the tree traversal engine 530, or the functions of compositing and reporting subsystems 540, 550 can be combined together. The interconnections shown as unidirectional can be implemented using bidirectional communication. For example, reporting subsystem 550 can (i) receive a query from a client, can (ii) retrieve composited data from compositing subsystem 540, directly from tree traversal engine 530, or from an internal output data store, can (iii) formulate a response to the query using retrieved data, and can (iv) provide the response to the requesting client.

Another Example Architecture with Dataflow

Figure 6:
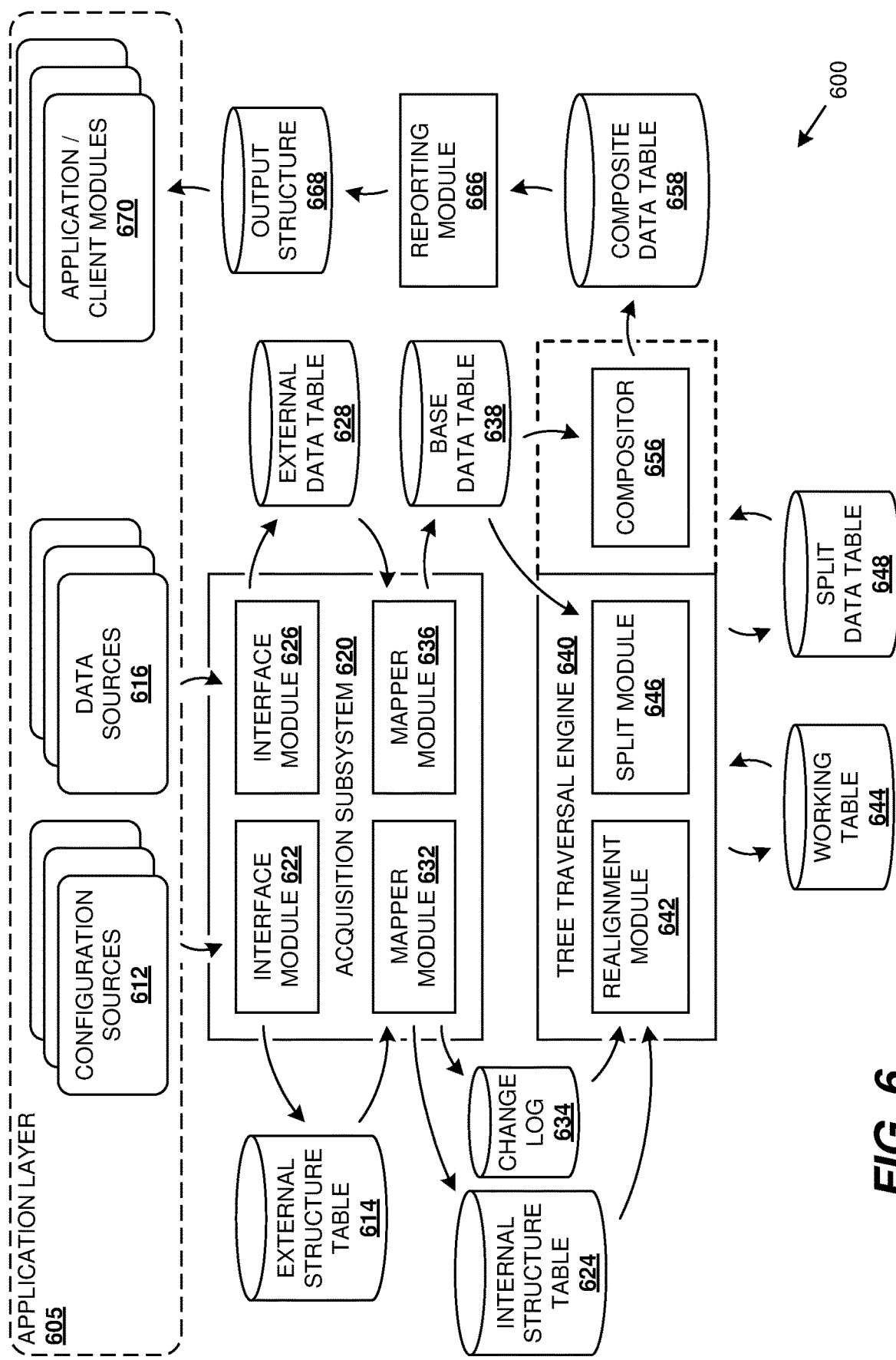
FIG. 6 is an architecture diagram of a system according to disclosed technologies, also showing exemplary dataflow.

FIG. 6 is an architecture diagram 600 of a system according to disclosed technologies, also showing exemplary dataflow. Diagram 600 shows three types of entities. A disclosed system has constituent modules and subsystems shown by square-cornered rectangles. The disclosed system is responsive to data provided by external sources in an application layer, and provides responses to one or more clients or applications in the application layer 605. Entities in application layer 605 are depicted by rectangles with rounded corners. Finally data items and structures created by, maintained by, or passed between system components are depicted by cylinders; some of these data items and structures can be tables, for example, in-memory column-store tables which can be SAP HANA® database tables.

Configuration sources 612 can be objects in data stores, application modules, or a computer input device, and can provide a range of configuration information including tree structures, operational parameters guiding traversal and enumeration procedures to be performed, parameters of reporting to be generated, and/or other configuration information related to the trees, processing of trees, or reporting to be delivered. Data sources 616 can likewise be objects in data stores, application modules, or a computer input device, and can provide values or parameters associated with respective tree nodes.

In the illustration of FIG. 6, the disclosed system includes an acquisition subsystem 620, a tree traversal engine 640, and a reporting module 666. In turn, acquisition subsystem 620 includes interface module 622 and mapper module 632 on the configuration side, and interface module 626 and mapper module 636 on the data side. On the configuration side, interface module 622 can be coupled to configuration sources 612 to receive configuration data (including, in examples, tree structure data) and store the received configuration data in one or more external structure tables 614. Mapper module 632 can be configured to process configuration data stored by the interface module 614 and create one or more internal structure tables 624 in a harmonized format for processing by tree traversal engine 640. Optionally, a change log 634 can be implemented for efficient management of incremental changes to tree structures. The data side components of acquisition subsystem 620 are analogous to the configuration side. Interface module 626 can be coupled to data sources 616 to receive tree node data and create one or more external data tables 628, which can be processed by mapper module 636 to provide one or more base data tables 638 containing data values for trees to be enumerated, in a harmonized format.

Tree traversal engine 640 performs level-by-level traversal of multiple trees, using internal structure tables 624, optional change log 634, and base data tables 638 as input, and producing one or more enumerated composite data tables 658 as output. Tree traversal engine 640 can maintain one or more working tables 644 and/or split data tables 648. Within the tree traversal engine 640, certain specialized modules 642, 646, 656 can be configured to perform specific tasks. Realignment module 642 performs change management when the structure of one or more trees is modified. By way of illustration, tree nodes can be stored level-by-level in a working table 644; adding a node at level 4 can cause addresses of all nodes of levels 5 and lower to be incremented by one. This and other changes can be managed by realignment module 642. Split module 646 performs functions related to splits in a tree structure, where a node of a parent tree is the root of a separate child tree which can be incorporated into the enumeration of the parent tree. Split data tables 648 can be used to maintain configuration information, pointers, one or more levels of a child tree, entire child trees and/or other working data to assist with management of splits in a tree structure. Compositor 656 can perform integration of child tree data (for example, from a split data table 648) with parent tree data (for example, from base data table 638) to produce enumerated output trees stored in one or more composite data tables.

In some examples, the enumerated output trees can be complete, and can incorporate every tree node of primary trees and all their referenced child trees, while in other examples, the enumerated output trees can be filtered according to specified filter conditions, and can contain only a subset of the primary and child tree nodes. In some examples, a single composite data table can store the enumeration of all trees traversed by tree traversal engine 640, while in other examples, the enumerated trees can be stored, after processing, in separate composite data tables for respective primary trees.

Reporting module 666 can be coupled between tree traversal engine 640 (or, compositor 656) and application client modules 670. Reporting module 666 performs post-processing on the composite data tables 658 to generate one or more output structures 668 and can provide these output structures 668 to the application client modules 670. Output structures 668 can be in the form of database tables, data structures (such as lists or sets or key-value pairs), single values, or messages. An output structures 668 can include an enumerated tree, a portion of a tree, a tree node, statistics from the tree traversal process, a summary or total of a parameter collected over a tree or grouped by node type, and/or a response to a query from an application or client.

The disclosed system can be distributed between a host computing environment and a data accelerator environment similar to systems 410 and 440 shown in FIG. 4. Each computing environment can include one or more processors with attached memory and associated with storage or memory in which various database tables and other data structures can be stored. In examples, varying portions of the system can be located in a data accelerator environment, including all or part of tree traversal engine 640, all or part of acquisition subsystem 620, compositing subsystem 656, and/or reporting subsystem 666, in any combination.

Many variations of the disclosed system or dataflow are possible. In examples, a uniform data format can be used by tree traversal engine and all applications, in which case the external data table 628 can be the same as the base data table 638, and mapper module 636 can be omitted. Similarly, mapper module 632 could be omitted. In examples, the functions of compositor 656 can be integrated with the level-by-level traversal of the tree traversal engine 640, and a distinct compositor 656 can be omitted.

Example Sequence Diagram

Figure 7:
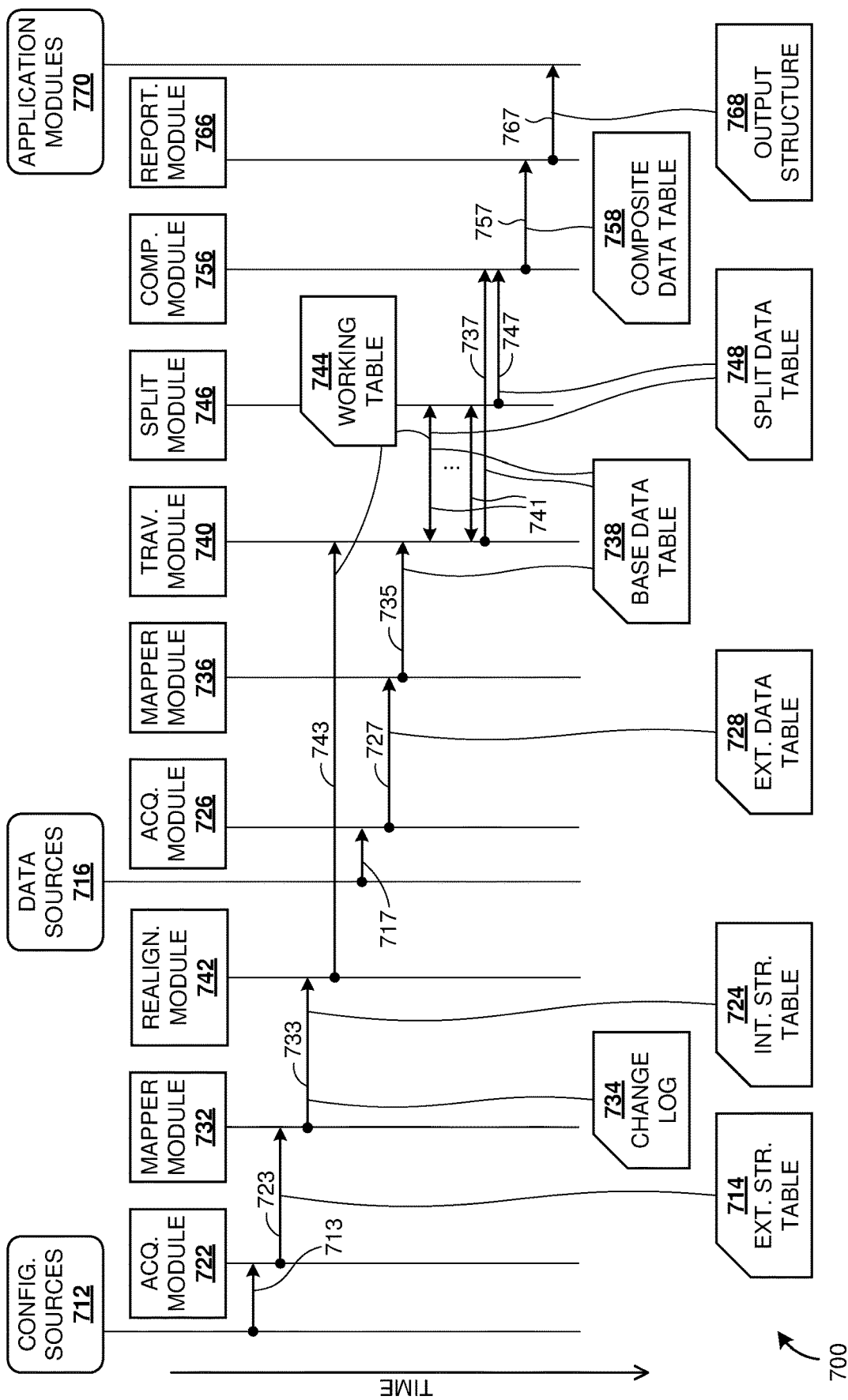
FIG. 7 is a sequence diagram according to disclosed technologies.

FIG. 7 is a sequence diagram 700 according to disclosed technologies, which depicts operations performed by a system comprising a number of modules or subsystems as actors, mediated by a number of data objects such as tables serving as output from one module and input to one or more following modules. The illustrated system is responsive to data provided by external sources in an application layer similar to 605, and provides responses to one or more clients or applications in the application layer.

At operation 713, configuration acquisition module 722 receives configuration and/or tree structure information for a plurality of trees from one or more configuration sources 712. The acquisition module 722 captures the received structure and/or configuration information in one or more external tables such as external structure table 714, and these can be made available to mapping module 732 at operation 723.

Mapping module 732 can transform the external table(s) 714 into internal tables such as internal structure table 724 and optionally a change log 734, and these can be made available to realignment module 742 at operation 733. In examples, external tables 714 can be structured as presented by application clients, while internal tables 724 can be structured in a form that can be used efficiently for level-by-level traversal of one or more tree structures. In examples, mapper 732 can reorganize trees as vectors or sequential table records, create indices for each level of a linearized tree, convert nodes to uniform sized data objects, generate labels for tree nodes, change data formats, and/or perform other mapping functions to harmonize the acquired structure and/or configuration data. The realignment module 742 prepares or adjusts indices and/or other parameters, in one or more working tables 744, that can be used for efficient level-by-level enumeration of trees by tree traversal module 740.

At operation 717, data acquisition module 726 receives configuration and/or tree structure information for a plurality of trees from one or more data sources 716. The acquisition module 726 captures the received structure and/or configuration information in one or more external tables such as external data table 728, and these can be made available to mapping module 736 at operation 727.

Mapping module 736 can transform the external table(s) 728 into internal tables, such as base data table 738, which can be made available to tree traversal module 740 at operation 735. In examples, external tables 728 can be structured as presented by data sources 716, while base data table 738 can be structured in a form suitable for efficiently populating one or more tree structures. In examples, mapper 736 can reorganize tree node data organized as defined by internal structure table 724, and/or perform other mapping functions to harmonize the acquired tree node data.

Tree traversal module 740 uses data in base data table 738 and configuration information from working tables 744 to perform level-by-level enumeration of multiple trees concurrently. In examples, tree structure information can be embedded within base data table 738, included within working table 744, and/or retrieved from internal structure table 724. When a split node is encountered, tree traversal module 740 can call split module 746 to determine or obtain information used to embed child tree nodes into the enumeration of parent trees. (In examples, tree traversal module 740 can also call split module 746 to identify split nodes.) Split module 746 can be called multiple times at each level, and can be called at each of one or more levels. Thus, the cooperative exchange of information between tree traversal module 740 and split module 746 is designated by a series of arrows 741. As tree traversal module 740 and split module 746 enumerate trees, data can be added to or retrieved from working tables 744 and/or split data table 746.

In some examples, child tree nodes can be merged into vectors of tree nodes as they are merged level-by-level, while in other examples, child tree node data can be collected in the split data table(s) for subsequent merging. The illustrated example 700 follows the latter case, and operations 737 and 741, respectively, provide base data table 738 and split data table 748 to compositing module 756, which merges child tree node data with parent tree node data into one or more composite data tables 758, which can be forwarded to reporting module 766 at operation 757. Finally, reporting module 766 prepares one or more output structures 768 or response messages, which can be returned to application clients 770 at operation 767.

Comparison of Enumeration Methods

Figure 8A:
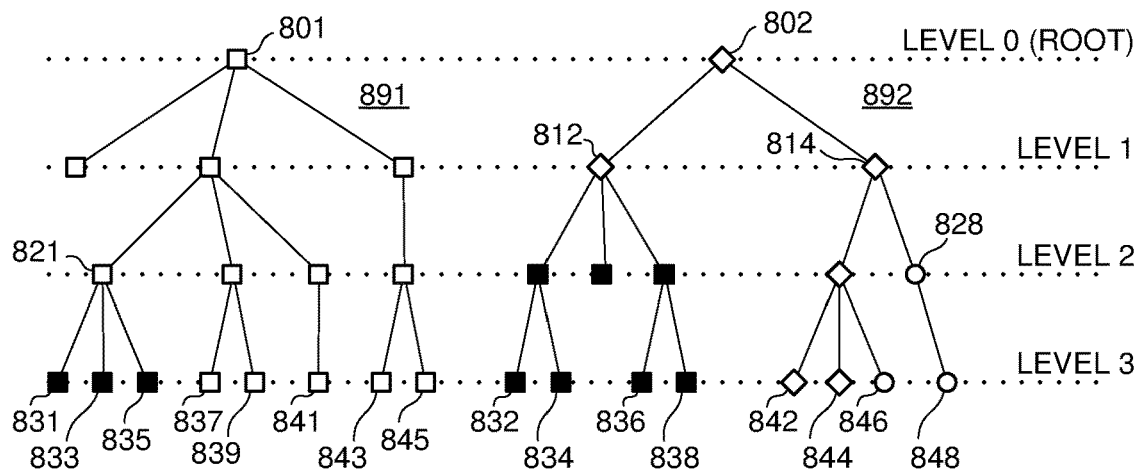
FIGS. 8A-8C are diagrams illustrating enumeration of example trees by different techniques.
Figure 8B:
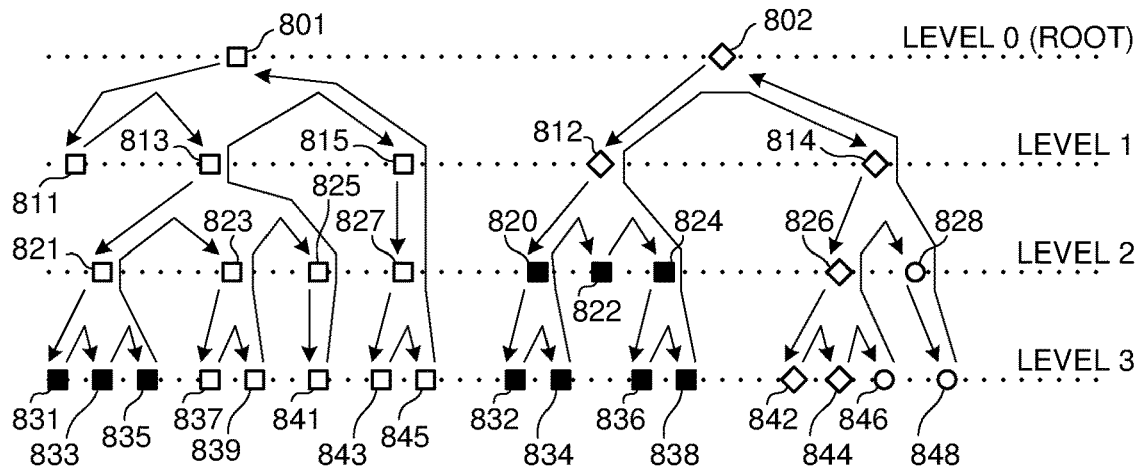
Figure 8C:
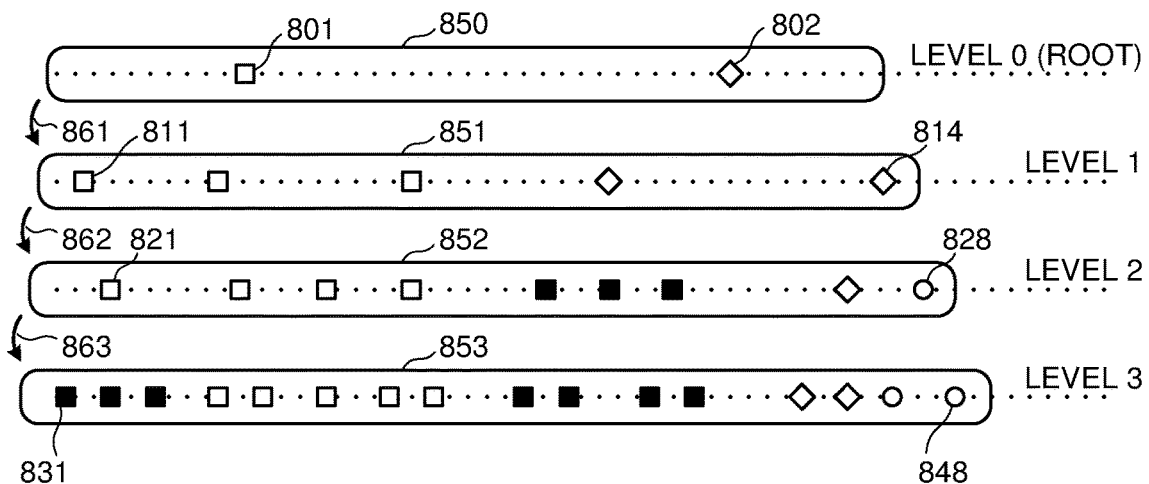

FIGS. 8A-8C are diagrams illustrating enumeration of example trees by different techniques. Tree structures are shown in FIG. 8A, conventional breadth-first traversal is shown in FIG. 8B, and the level-by-level traversal of the disclosed technologies is shown in FIG. 8C. The trees are the same in each of FIGS. 8A-8C, however, for clarity of illustration, edges are omitted from FIGS. 8B-8C, and some node labels are variously omitted.

FIG. 8A shows two primary trees 891, 892 having respective root nodes 801 and 802 at level 0. The nodes described in these two trees are shown by open squares (tree 891) and open diamonds (tree 892), respectively. Thus, primary tree 891 has 1, 3, 4, and 5 nodes at levels 0, 1, 2, and 3, respectively, as shown by open squares. Top-level tree 892 has 1, 2, 1, and 2 nodes at levels 0, 1, 2, and 3, respectively, as shown by open diamonds. FIG. 8A also shows some nodes as solid squares (e.g., 831) or open circles (e.g., 848), which are not directly part of the primary trees 891, 892.

Nodes 821 and 812 are split nodes; they can be represented as single nodes in the primary trees, but have their own subtree structure defined in child trees or split tables. In the example, nodes 812 and 821 are identical. Node 812 has one child tree, which has three nodes at level 1 (820, 822, 824) and four nodes (832, 834, 836, 838) at level 2, and could have additional nodes at further lower levels of the illustrated tree. Because the child tree is the same, nodes 831, 833, 835 are respectively identical to nodes 820, 822, 824, and could have further child nodes if level 4 was shown.

Node 828 is a synthesized node, that can be created to satisfy a constraint at parent node 814 if the existing child nodes of 814 (in this case only node 826) did not already satisfy the constraint. Node 846 likewise can be synthesized to satisfy a constraint at its parent node 826. In some examples, a synthesized node 828 can have a further synthesized child node 848 to satisfy a constraint at node 828, while in other examples a synthesized node can be treated as a leaf node without any child nodes, synthesized or otherwise.

Turning to FIG. 8B, conventional depth-first traversal of trees 891, 892 is illustrated, starting at their respective root nodes 801, 802. At any tree node, its subtree(s) can be traversed before proceeding to any sibling nodes. In this illustration, traversal is shown proceeding from left-to-right. Thus, the traversal of tree 891 starts at root node 801, proceeds to node 811 at level 1. Since node 811 has no children, traversal proceeds to sibling node 813, and thence to child nodes 821 and 831 at levels 2 and 3. Once traversal of siblings 833 and 835 is complete, the subtree of node 821 is complete and traversal proceeds to its sibling 823. Finally, after node 845 has been traversed, the subtrees of nodes 827, 815, and root node 801 are all complete, and the traversal of tree 891 is complete. The traversal of the primary tree 892 can be similar, and can be performed after the traversal of tree 891.

Finally, FIG. 8C shows level-by-level traversal of trees 891, 892 together, according to disclosed technologies. Unlike breadth-first traversal of a single tree, the illustrated level-by-level traversal operates on multiple trees (such as 891, 892) at the same time, or within the same operations. At level 0, vector 850 can be prepared in which the root nodes of all primary trees can be collected. Vector 850 can be processed as indicated by arrow 861 to obtain output vector 851 in which all level 1 nodes can be represented. In examples, the processing indicated by each arrow 861-863 can be similar to that described in the context of FIG. 3. Vectors 861 and 862 can be processed similarly, in sequence, to obtain vectors 862 and 863. As part of the disclosed technology, the level-by-level traversal illustrated in FIG. 8C provides some significant performance advantages as described herein.

Many variations of FIGS. 8A-8C are possible. In particular, the diagrams can be extended horizontally to include more, even many more, primary trees. In examples, the number of primary trees can be two, three, four to six, seven to ten, 11-20, 21-50, 51-100, or even more. Vector lengths of up to 100, 1000, 10,000, 100,000, 1,000,000, or even more nodes can be supported. The diagrams can also be extended vertically to include more, even many more, levels. In examples, the number of levels can be two, three, four to six, seven to ten, 11-20, 21-50, 51-100, or even more. In examples, a child tree can itself be a primary tree, for example, by adding a node 803=821 at the root level. In examples, a child tree can itself include one or more split nodes, whereby a node of a primary tree can have a child tree, which can have a grandchild tree, and so on. In some examples, trees can have variable depth along different branches, while in other examples, a primary tree can be constrained by definition to have a uniform fixed depth, which can result in truncation of child trees. In examples, the total number of nodes to be enumerated can be up to 10,000, 100,000, 1 million, 10 million, 100 million, 1 billion ($10^9$) or even higher.

In some examples, recursion can be allowed, while in other examples recursion can be technically possible but not allowed. In the latter examples, the processing at, e.g., 863 can include a recursion check. By way of illustration, nodes 833 and 813 could be identical, which can be detected and reported as a recursion error while evaluating the vector 853. However, if node 802 is not part of the child tree of node 812, no recursive error should be flagged in the traversal of tree 892. An example where recursion could be allowed is in a tree representing a chemical process, where an input compound is reacted with other compounds and, after one or more process operations, some of the input compound is again produced.

Example Composition Method

FIGS. 9A-9E are diagrams illustrating composition of base and split tables according to disclosed technologies.

FIG. 9A depicts a simple portion of a primary tree having root node 901 and two level one nodes 911, 912. Node 912 is a split node, whose children 921, 922 can be imported from a child tree.

FIG. 9B illustrates a base data table 945 for the primary tree, in which each node 901, 911, 912 is represented by a row. Each row contains a sort index as described herein, a node identifier or label, one or more flags, and can contain one or more other fields. Examples of flags include a flag (dubbed "SP" and having binary code 100) that indicates whether or not a node is split, a flag (dubbed "L" and having binary code 010) that indicates whether or not a node is a leaf node, and a flag (dubbed "SY" and having binary code 001) that indicates whether or not a node is a synthesized node. FIG. 9B includes a legend showing the binary codes for these flags; multiple flags can be combined with a bitwise OR operation and decoded with corresponding masks. Examples of other fields can include a node label or description indicating a physical or data object represented by the node, or a count of physical or data objects represented by the node. In the illustration, processing of node 912 at level 1 determines that node 912 is a split node. This processing could happen, for example, during the level-by-level traversal indicated by 862 of FIG. 8 or arrows 741 of FIG. 7. Then, the split node flag SP can be set to 1 (e.g. binary 1xx, where the symbol "x" denotes an unknown or "don't care" bit position) for the record for node 912 (for example, by traversal module 740) to indicate that node 912 is a split node, transforming base data table 945 as shown in FIG. 9C. In addition, the child tree of node 912 can be located, and its level 1 nodes can be identified or collected in split data table 955, as shown in FIG. 9D. Finally a compositor module such as 756 or 656 can combine rows from the split data table 955 with the base data table 945 to form composite data table 965 as shown in FIG. 9E.

Example of Enumeration

FIGS. 10A-10E are diagrams illustrating enumeration of trees similar to trees 891, 892 according to disclosed technologies. FIGS. 10A-10C illustrate the accumulation of levels 0-2, while FIG. 10D illustrates sorting of an accumulated table. In these diagrams each row of a depicted table represents a tree node; the tree nodes 801-848 match the nodes and structure shown in FIGS. 8A-8C.

FIG. 10A shows a table of nodes for level 0 of trees 891, 892, containing rows merely for root nodes 801, 802. Each row contains a sort index field, a flag field, and can contain other fields represented generically by the column "Field(s)" in FIG. 10A (and similarly in FIGS. 10B-10E. The sort index can be a text label, in this case simply "1" and "2" for nodes 801, 802. In FIGS. 10A-10E, the flag field for a given node include three flags—a split node flag indicating whether the given node is split (SP, 1xx) or not split (0xx), a leaf node flag indicating whether the given node is a leaf node (L, x1x) or non-leaf node (x0x), and a synthesized node flag indicating whether the given node is a synthesized node (SY, xx1) or not a synthesized node (xx0). Alternatively, the flag field can include other and/or additional flags, or the flag field can include an enumerated type value that indicates properties of a given node.

After processing a level 0 vector such as 850, the level 1 vector such as 851 can be obtained, containing nodes 811, 813, 815, 812, 814. Rows of the nodes of vector 851 can be concatenated with the level 0 table of FIG. 10A to obtain the table of FIG. 10B, which contains the original two rows from FIG. 10A, and five additional rows for nodes 811-814 as shown. In this illustration, the sort indices of the level nodes are built by concatenating their sortable parent labels with an index for each child. Thus, nodes 811, 813, 815 can be designated children "1," "2," and "3" of root node 801 (which has parent label "1") to obtain full labels for nodes 811, 813, 815 that are "1.1," "1.2," and "1.3," respectively. Similarly, the child nodes of root node 802 (parent label "2") have sort indices "2.1" and "2.2." The "." in the sort indices are not a requirement; in examples, any delimiter or no delimiter can be used, or an altogether different sortable representation.

Additionally, FIG. 10B shows nodes 811 and 812 having flags set. The SP flag on node 812 indicates that it is a split node, while the L flag on node 811 indicates that it is a leaf node, for example. None of the nodes in FIG. 10B is a synthesized node (SY flag is 0 for each node). In examples, flags can be used as aids to the enumeration process: a split node flag SP (1xx) can be used to indicate that child nodes at a next level can be obtained from a separate child tree structure, and a leaf node flag L (x1x) can be used to indicate that the flagged node has no child nodes at the next level.

Following processing of a level 1 vector such as 851, rows corresponding to nodes of output vector 852 can be added to the table of FIG. 10B to obtain the table of FIG. 10C. Nodes 821, 823, 825 are child nodes of level 1 node 813 (parent label "1.2") and can be assigned sort indices "1.2.1," "1.2.2," and "1.2.3." The other level 2 nodes can be assigned sort indices similarly. Because node 821 is a split node, it has its flag SP set (100). Because node 822 is a leaf node, it has its flag L set (010). The SY flag (001) on node 828 indicates that it is a synthesized node. The synthesized node flag SY can be used to indicate special processing for synthesized nodes, or to allow a synthesized node to be removed from a tree at a later time when a parent node constraint is satisfied by its other child nodes and the synthesized node is no longer needed. The rows of the level 0 and level 1 nodes can be left unchanged.

Following processing of a level 2 vector such as 852, rows corresponding to nodes of output vector 853 can be added to the table of FIG. 10C to obtain the table of FIG. 10D. For compactness of illustration, only the portion of the table corresponding to tree 892 is shown in FIGS. 10D-10E. Level 3 nodes 832-848 have been added. In this example, nodes 836, 838, 842 are leaf nodes and have their respective L flags set (010), while nodes 846, 848 are synthesized nodes and have their respective SY flag set (001).

(depending on whether "0" can be used or is reserved). For the sake of presentation, sortable indices are shown with decimals separating numeric characters, but the decimal values need not be represented in the actual stored values. Also, longer strings can be used. With four digits per node, "0000" to "9999" can be represented, allowing branching of 9999 or 10,000 child nodes. Additionally other sortable characters can be used, including alphabetic characters "A"-"Z" or any subset of the ASCII or Unicode character sets.

Example Pseudo-Code for Enumeration

Table 1 shows some example pseudo-code for enumeration of trees, including determination of split nodes.

TABLE 1

| | |
|---|---|
| 100 | Initialize Level L ← 0; |
| 105 | Vector(0) ← ExtractRoots(Tables) \| SortIndex(""); |
| 110 | AllNodes ← Vector(0); |
| 115 | Do; |
| 120 |    L ← L+1; |
| 125 |    Vector(L) ← ExtractChildren(Tables, Vector(L-1)) \| SortIndex(Vector(L-1)); |
| 130 |    Split ← FindSplitNodes(Vector(L)); |
| 135 |    Vector(L)(Split).Flag ← FlagSplitNode; |
| 140 |    AllNodes ← AllNodes \| Vector(L); |
| 145 |    If Length(Vector(L)) = 0, Then Exit; |
| 150 | End Do; |

Finally, the table of FIG. 10D can be lexically or alphabetically sorted according to sort index, to obtain the sorted table shown in FIG. 10E. As shown, the contents of each node's row can be unchanged, but the nodes can be grouped with their parent nodes. For example, nodes 820, 822 are level 2 siblings; node 820 has child nodes 832, 834. Thus, in the sorted table, the rows for nodes 832, 834 can be placed in between the rows for nodes 820, 822.

By way of illustration, in FIG. 10D, the entries for nodes 814, 820 are not in sort order: for a lexicographically increasing sort, "2.1.1" should precede "2.2". Similarly the entries for nodes 828, 832 are out of order, as "2.1.1.1" should precede "2.2.2". Following the sort, as shown in FIG. 10E, the entries are all in lexical sort order: the sort index "2.1.1" is properly positioned between "2.1" and "2.2," and "2.1.1.1" is properly positioned between "2.1.1" and "2.1.2." Thus, in the sorted table of FIG. 10E, all descendants of second-level node 820 (sort index "2.1.1") are placed between second-level nodes 820 and 822, and all descendants of first-level node 812 (sort index "2.1") are placed between first-level nodes 812 and 814. Lexical sorting on the sort index preserves the sequence or hierarchy positions of all nodes within their trees, even when level-by-level traversal is employed. In examples, a sort index of character or string type facilitates sorting in lexical or alphabetical order. Alternatively, the entries for nodes can be sorted by node index or label (as opposed to sort index).

While doing a conventional depth-first enumeration, each child node remains associated with its parent. However in a level-by-level enumeration, there could be no automatic way to identify the parent node for, e.g., the fourth node of output vector 852. It can even be difficult to identify the primary tree for an output vector node. By using sort indices, the tree structure can be preserved or reconstructed easily, as shown.

Many variations are possible. For simplicity, the illustrated example uses a single numeral character as a position indicator at each level, which restricts tree branching to a maximum of 9 or 10 child nodes for any parent node At line 100, the level L can be initialized to 0, the root level. Data tables Tables store all tree node data and can be similar to base data tables 638. At line 105, the root level vector of nodes Vector(0) can be formed by extracting the root nodes of all primary tables from Tables. Additionally a SortIndex field (similar to that shown in FIG. 10) can be attached to each element of Vector(0), as indicated by the pseudo-code notation "ISortIndex(')" where the " " argument is a null string indicating that the sort index at level 0 has no prefix. The aggregated enumeration AllNodes can be initialized to Vector(0) at line 110.

Lines 115 to 150 describe a loop over lower levels of the primary trees. At line 120, the loop index L is incremented to 1, 2, 3, . . . on successive loop iterations. At line 125, vector Vector(L) is formed from the child nodes of each node in Vector(L-1), extracted from Tables using Vector(L-1) as a parameter. Vector(L-1) and Vector(L) can be analogous to the input vector and output vector, respectively, described in context of FIG. 2. The ExtractChildren( ) function can import children of split nodes based on a split node flag described further below; on the first loop iteration, Vector(L-1) is the root level vector; in examples, the root node of a primary tree cannot be a split node.

At line 130, Vector(L) is examined to determine which of its nodes are split nodes. The indices of split nodes are saved in Split. At line 135, a flag FlagSplitNode (analogous to the SP flag of FIG. 10) is set for all the split nodes of Vector(L). These flags can be used to track down and import children of split nodes at line 125 of the next loop iteration. At line 140, Vector(L) is aggregated into AllNodes. At line 145, the length of Vector(L) is tested. If the length is zero, then all primary trees and all imported child trees have been exhausted, and there are no child nodes at level L. In this case, the Exit call terminates both the loop and the tree enumeration.

Example Results

Figure 11:
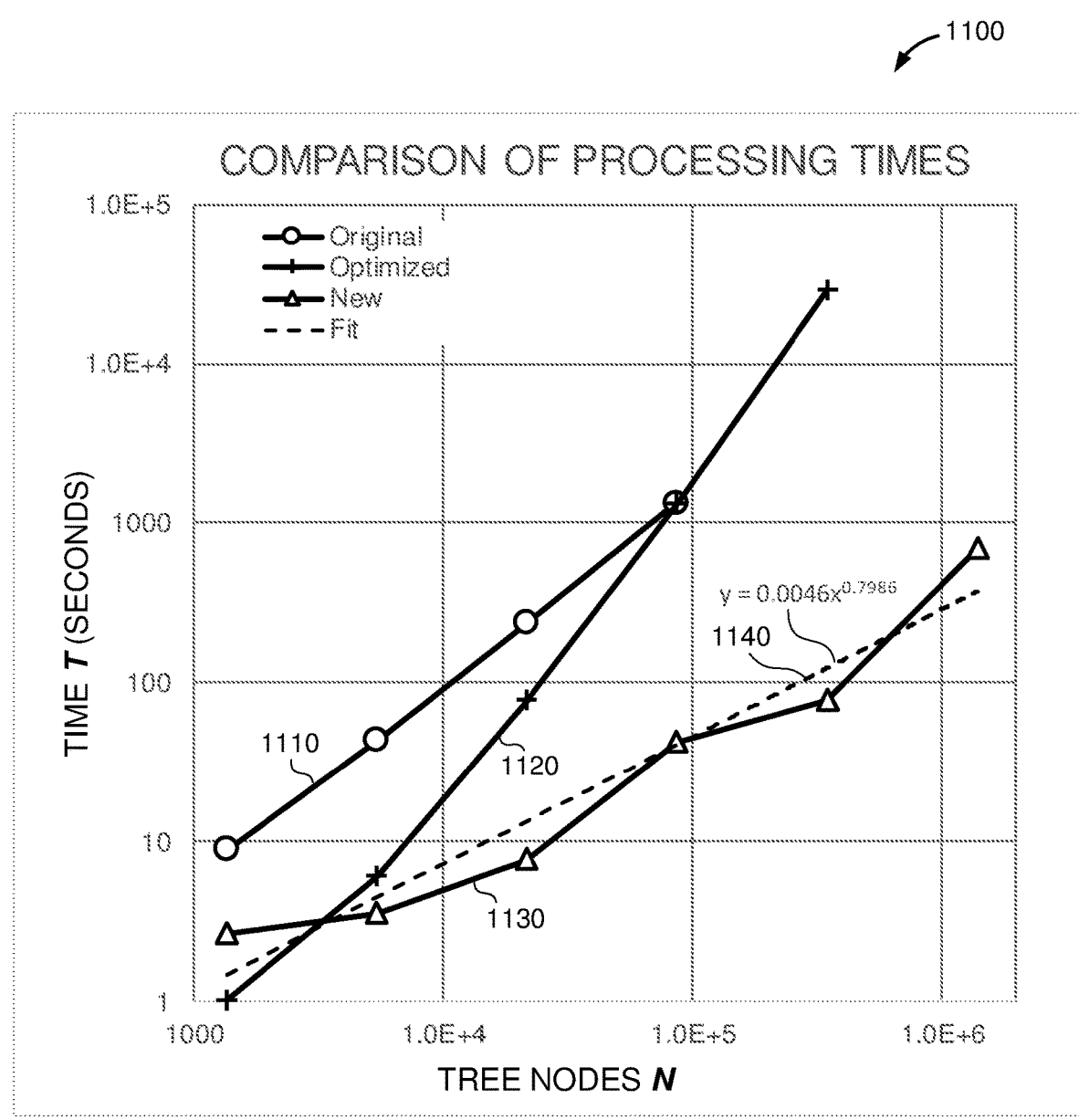
FIG. 11 is a chart showing a comparison of processing times for enumerating trees by different techniques.

FIG. 11 is a chart 1100 showing a comparison of processing times for enumerating trees by different techniques.

For this study, a tree model was constructed similar to the trees of FIG. 8A. Three different techniques were used, and for each technique, the tree model was traversed to different depths, resulting in a wide range of number of tree nodes (N) processed, from about $10^3$ to over $10^6$. This study provides insight into performance both in terms of time comparison, and also in terms of scaling with N.

In chart 1100, processing time T is shown on the vertical axis, and number of nodes N is shown on the horizontal axis; both axes use logarithmic scales. Data series 1110 depicts the performance by a conventional technique, following a depth-first tree traversal substantially similar to that shown in FIG. 8B. The processing time is relatively high compared to other techniques, and the scaling is approximately $T \sim N^{1.2}$. Data series 1120 depicts the performance by an optimized technique, still following depth-first tree traversal similar to the data of series 1110, but using facilities available in the ABAP environment for code optimization and performance tuning. It can be seen that the performance times in series 1120 are considerably improved compared to series 1110, up to an order of magnitude (10×) improvement at lower node counts N. However, the scaling of series 1120 is $T \sim N^{2.2}$, so that the performance gains diminish as N approaches approximately $10^5$. Data series 1110 and 1120 both show data obtained in a conventional database environment similar to the host system 410 of FIG. 4.

Data series 1130 shows the measured performance obtained using disclosed technologies. Breadth-first tree traversal is used similar to that shown in FIG. 8C, and the tree enumeration is performed in a database accelerator similar to 440 shown in FIG. 4, with the software program pushed down into the database layer. As can be seen, the processing times are much improved compared to the original technique of series 1110, and, except for the lone data point at N=1365, significantly improved compared even with the optimized technique of series 1120. At N=350,000, the performance improvement is over 300×. Thus, the disclosed technologies provide demonstrably superior results.

Furthermore, the dashed line 1140 shows a fit to the data of series 1130. It can be seen that the scaling is approximately $T \sim N^{0.8}$. This is a surprising and unexpectedly superior result. As one of ordinary skill will recognize, tree enumeration involves every node being evaluated once, hence an expected scaling would be $T \sim N^{1.0}$. The demonstrably improved scaling shown in series 1130 applies over multiple orders of magnitude and is a valuable feature. Particularly it shows that two (or more) trees can be enumerated faster together than separately, which is an altogether surprising and unexpected result. Assuming ideal scaling along the dashed line 1140, a tree of size $10^4$ nodes would take about 7.2 seconds, so that two trees of this size, processed separately, would take 7.2+7.2=14.4 seconds. However processed together, the node count is 20,000 and takes only 12.5 seconds, an improvement of over 13%.

Table 2 shows the actual measured data for this study.

TABLE 2

| Levels | Nodes | Original 1110 | Optimized 1120 | New 1130 |
|---|---|---|---|---|
| 6 | 1365 | 8.93 | 1.013 | 2.647 |
| 7 | 5461 | 43.065 | 6.018 | 3.543 |
| 8 | 21845 | 236.584 | 77.656 | 7.711 |
| 9 | 87381 | 1339.076 | 1332.08 | 42.378 |
| 10 | 349525 | | ~28800 | 77.739 |
| 11 | 1398101 | | | 685.248 |

Comparing the new 1130 data for 7 and 8 levels, it is observed that the node count N is increased by approximately 4×, while the processing time increases by less than 2.2×. Comparing the new 1130 data for 8 and 10 levels, it is observed that the node count N is increased by approximately 16×, while the processing time increases by merely 10×.

Processing times can be affected by overhead contributions. Some overhead contributions can be constant or slowly increasing (e.g., proportional to number of levels), while other overhead contributions (e.g., related to cache sizes or page faults) can significantly increase with N. The new technique (of 1130) may have a different mix of overhead factors compared to comparative techniques (1110, 1120); in particular, the new technique may be substantially free from some of the overhead factors that complicate the original (1110) or optimized (1120) techniques.

Applications

Examples of trees can be found in engineering, data science, business, and other areas. Any of these fields of endeavor can benefit from the disclosed technology.

In engineering, trees can be used to represent bills of materials, where it is common to have modular bills of materials, with a split node representing a sub-assembly having its own child tree structure. Trees are also commonly used in computer graphics to represent components of a scene. A split node in a primary description of a scene can point to a subtree representing, for example, a moving portion within the scene. By way of illustration, a subtree can represent a car with occupants, in a scene with a road in the foreground and a backdrop of mountains and scenery.

In data science, many documents and databases are stored in XML or an equivalent hierarchical form. Additionally, documents can link to other documents, which can also be stored in XML, leading to applications for processing multiple tree structures, with split nodes representing linked documents. Trees are also widely used for indexing (e.g., in filesystems and databases) and for search optimization (e.g., balanced binary trees), leading to further applications.

In business, sales data can be organized into hierarchical structures of territories, regions, and sales offices. In examples, consolidated data for a territory can be known, but data for a particular sales office could be missing, in which case it can be desirable to synthesize a child node to make the territory (parent node) data consistent with its child nodes.

A Generalized Computer Environment

Figure 12:
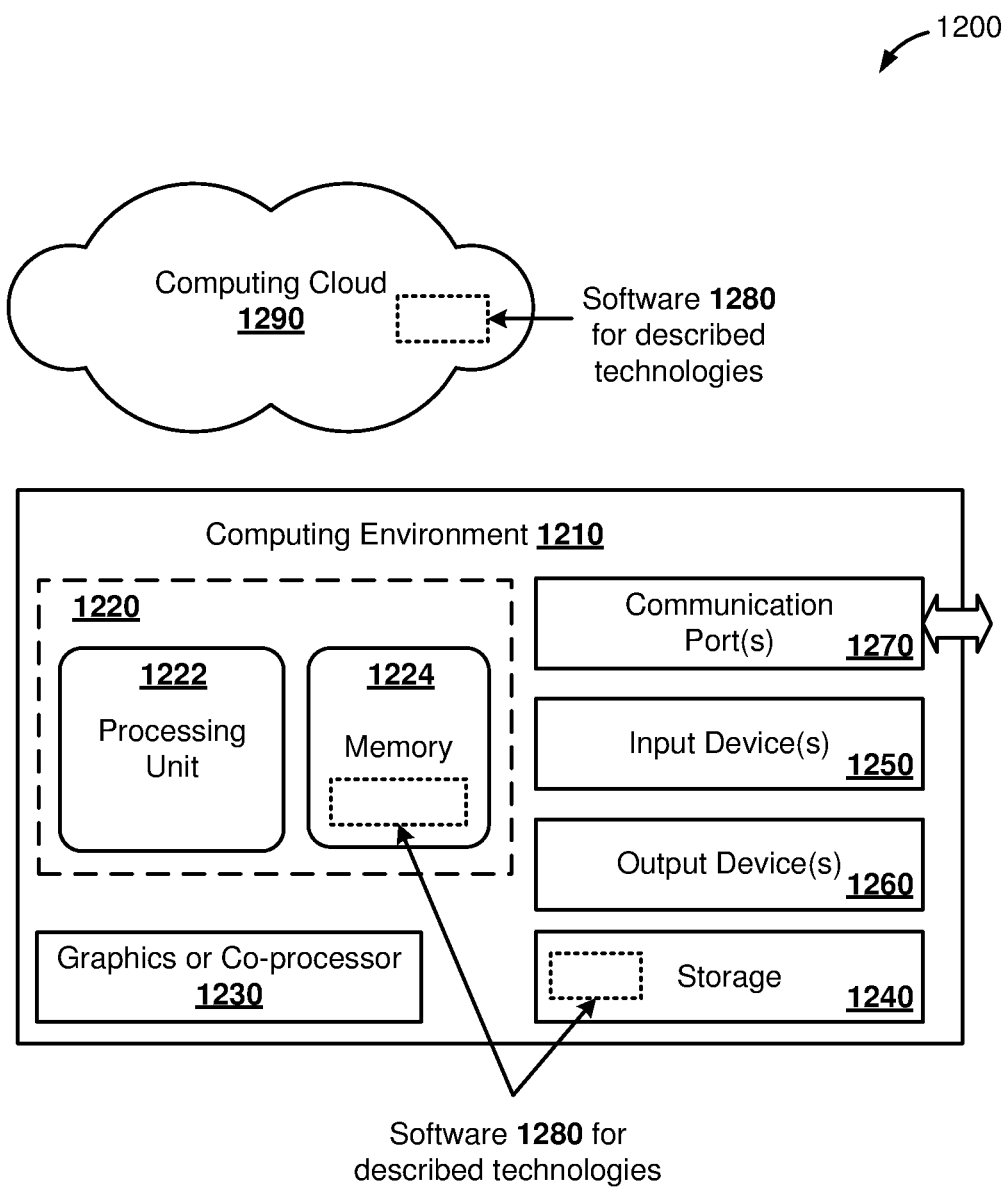
FIG. 12 is a diagram schematically depicting a computing environment suitable for implementation of disclosed technologies.

FIG. 12 illustrates a generalized example of a suitable computing system 1200 in which described examples, techniques, and technologies, including construction, deployment, operation, and maintenance of a database acceleration system can be implemented according to disclosed technologies. The computing system 1200 is not intended to suggest any limitation as to scope of use or functionality of the present disclosure, as the innovations can be implemented in diverse general-purpose or special-purpose computing systems.

With reference to FIG. 12, computing environment 1210 includes one or more processing units 1222 and memory 1224. In FIG. 12, this basic configuration 1220 is included within a dashed line. Processing unit 1222 executes computer-executable instructions, such as for implementing any of the methods or objects described herein for traversing or enumerating one or more tree structures, for synthesizing tree nodes, for detecting structural errors such as recursion in a tree, for importing nodes from a referenced child tree into a primary tree, or various other architectures, components, handlers, managers, modules, and repositories described herein. Processing unit 1222 can be a general-purpose central processing unit (CPU), a processor in an application-specific integrated circuit (ASIC), or any other type of processor. In a multi-processing system, multiple processing units execute computer-executable instructions to increase processing power. Computing environment 1210 can also include a graphics processing unit or co-processing unit 1230. Tangible memory 1224 can be volatile memory (e.g., registers, cache, or RAM), non-volatile memory (e.g., ROM, EEPROM, or flash memory), or some combination thereof, accessible by processing units 1222, 1230. The memory 1224 stores software 1280 implementing one or more innovations described herein, in the form of computer-executable instructions suitable for execution by the processing unit(s) 1222, 1230. The memory 1224 can also store configuration data, tree structure information, tables including structure tables, data tables, working tables, change logs, output structures, input vectors, output vectors, sort indices, or flags, as well as other configuration and operational data.

A computing system 1210 can have additional features, such as one or more of storage 1240, input devices 1250, output devices 1260, or communication ports 1270. An interconnection mechanism (not shown) such as a bus, controller, or network interconnects the components of the computing environment 1210. Typically, operating system software (not shown) provides an operating environment for other software executing in the computing environment 1210, and coordinates activities of the components of the computing environment 1210.

The tangible storage 1240 can be removable or non-removable, and includes magnetic disks, magnetic tapes or cassettes, CD-ROMs, DVDs, or any other medium which can be used to store information in a non-transitory way and which can be accessed within the computing environment 1210. The storage 1240 stores instructions of the software 1280 (including instructions and/or data) implementing one or more innovations described herein.

The input device(s) 1250 can be a mechanical, touch-sensing, or proximity-sensing input device such as a keyboard, mouse, pen, touchscreen, trackball, a voice input device, a scanning device, or another device that provides input to the computing environment 1210. The output device(s) 1260 can be a display, printer, speaker, optical disk writer, or another device that provides output from the computing environment 1210.

The communication port(s) 1270 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1200 can also include a computing cloud 1290 in which instructions implementing all or a portion of the disclosed technology are executed. Any combination of memory 1224, storage 1240, and computing cloud 1290 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in one or another form of physical computer hardware.

An Example Cloud Computing Environment

Figure 13:
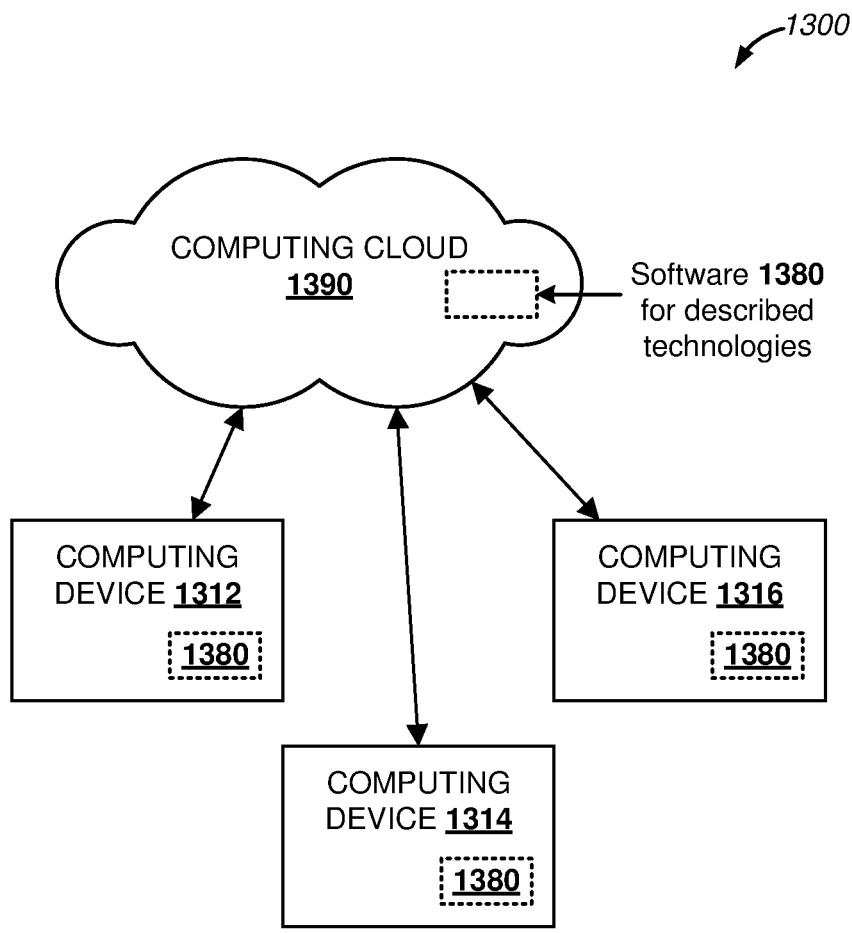
FIG. 13 is a diagram schematically depicting computing devices operating in conjunction with a computing cloud for implementation of disclosed technologies.

FIG. 13 depicts an example cloud computing environment 1300 in which the described technologies can be implemented. The cloud computing environment 1300 comprises a computing cloud 1390 containing resources and providing services. The computing cloud 1390 can comprise various types of cloud computing resources, such as computer servers, data storage repositories, networking resources, and so forth. The computing cloud 1390 can be centrally located (e.g., provided by a data center of a business or organization) or distributed (e.g., provided by various computing resources located at different locations, such as different data centers and/or located in different cities or countries).

The computing cloud 1390 can be operatively connected to various types of computing devices (e.g., client computing devices), such as computing devices 1312, 1314, and 1316, and can provide a range of computing services thereto. One or more of computing devices 1312, 1314, and 1316 can be computers (e.g., server, virtual machine, embedded systems, desktop, or laptop computers), mobile devices (e.g., tablet computers, smartphones, or wearable appliances), or other types of computing devices. Connections between computing cloud 1390 and computing devices 1312, 1314, and 1316 can be over wired, wireless, or optical links, or any combination thereof, and can be short-lived or long-lasting. These connections can be stationary or can move over time, being implemented over varying paths and having varying attachment points at each end. Computing devices 1312, 1314, and 1316 can also be connected to each other.

Computing devices 1312, 1314, and 1316 can utilize the computing cloud 1390 to obtain computing services and perform computing operations (e.g., data processing, data storage, and the like). Particularly, software 1380 for performing the described innovative technologies can be resident or executed in the computing cloud 1390, in computing devices 1312, 1314, and 1316, or in a distributed combination of cloud and computing devices.

GENERAL CONSIDERATIONS

As used in this disclosure, the singular forms "a," "an," and "the" include the plural forms unless the context clearly dictates otherwise. Additionally, the terms "includes" and "incorporates" mean "comprises." Further, the terms "coupled" or "attached" encompass mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "apply," "build," "check," "collect," "determine," "extract," "find," "gather," "get," "grow," "identify," "list," "process," "provide," "prune," "push," "respond," "update," and "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1224, and storage 1240. The term computer-readable storage media does not include signals and carrier waves. In addition, the term computer-readable storage media does not include communication ports (e.g., 1270) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, *Julia*, Lisp, Matlab, Octave, Perl, Python, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A computer system for concurrently performing operations on multiple data structures which are primary trees, the computer system comprising one or more computing stations each comprising one or more processors, memory coupled thereto, and one or more network adapters, the one or more computing stations being interconnected by one or more network connections and implementing a database acceleration system comprising:

a configuration acquisition subsystem hosted on one or more of the computing stations and configured to acquire configuration information of the multiple primary trees into one or more database tables;

a data acquisition subsystem hosted on one or more of the computing stations and configured to acquire a snapshot of data for at least one of the multiple primary trees; and a tree traversal engine hosted on one or more of the computing stations, connected to receive one or more inputs from the configuration acquisition subsystem and/or the data acquisition subsystem, and configured to accelerate database operation by:

jointly enumerating the multiple primary trees by performing concurrent traversal of the multiple primary trees, level-by-level, wherein the multiple primary trees are disjoint; and building a representation of the traversed primary trees wherein for a first tree of the multiple primary trees and a first object described in the first tree which is not a root of the first tree: the first object has a child object that is listed in a second tree having the first object as its root; and the database acceleration system further comprising:

a compositing subsystem hosted on one or more of the computing stations and configured to combine the child object with objects described in the first tree to obtain a composite data structure.

2. The computer system of claim 1, the database acceleration system further comprising a reporting subsystem hosted on one or more of the computing stations and configured to transmit the composite data structure over a network connection to a computer-implemented client application.

3. The computer system of claim 1, the database acceleration system further comprising a reporting subsystem hosted on one or more of the computing stations and configured to:

gather one or more parameters from the composite data structure into an output structure, and transmit the output structure over a network connection to a computer-implemented client computer.

4. The computer system of claim 1, wherein the tree traversal engine is a software module contained within a database layer of a database environment.

5. The computer system of claim 1, wherein the configuration acquisition subsystem, the data acquisition subsystem, and the tree traversal engine, comprise instructions stored in one or more computer-readable media and executed by one or more of the processors having memory coupled thereto.

6. The computer system of claim 1, wherein the tree traversal engine is further configured to build respective sortable labels for traversed nodes of the multiple primary trees.

7. The computer system of claim 6, wherein the tree traversal engine is further configured to build the respective sortable labels by concatenating sortable labels of respective parent nodes of the traversed nodes with respective labels of the traversed nodes.

8. One or more computer-readable storage media storing instructions which, when executed by one or more hardware processors, cause the hardware processors to perform operations comprising:

acquiring configuration information of multiple data structures, which are primary trees, into one or more database tables;

wherein for a first tree of the multiple primary trees, a first object described in the first tree has a child object that is not listed in the first tree;

acquiring a snapshot of data for at least one of the multiple primary trees;

accelerating database performance by jointly enumerating the multiple primary trees by performing concurrent traversal of the multiple primary trees, level-by-level;

computing the child object to satisfy a constraint on the first object;

setting a flag on a tree node representing the child object to indicate that the tree node is a synthesized node;

combining the child object with objects described in the first tree to obtain a composite data structure;

generating an output structure representing the multiple primary trees based on the jointly enumerating, wherein the output structure includes information of the child object obtained from the composite data structure; and transmitting the output structure to a client application.

9. The one or more computer-readable storage media of claim 8, wherein the operations further comprise building respective sortable labels for traversed nodes of the multiple primary trees.

10. The one or more computer-readable storage media of claim 8, wherein the child object is a first child object, wherein a second object described in the first tree has a second child object not listed in the first tree but listed in a second tree having the second object as its root, and wherein the second object is distinct from a root of the first tree.

11. The one or more computer-readable storage media of claim 10, wherein the operations further comprise:

setting a flag on a tree node representing the first second object in the first tree, to indicate that the second child object is listed in the second tree, which is distinct from the first tree.

12. The one or more computer-readable storage media of claim 8, wherein the generating the output structure comprises gathering one or more parameters from the composite data structure.

13. A method comprising:

receiving a request to enumerate components of multiple distinct primary trees;

wherein for a first tree of the multiple primary trees and a first object described in the first tree but not a root of the first tree: the first object has a child object that is listed in a second tree having the first object as its root;

acquiring configuration information of multiple primary trees into one or more database tables;

acquiring data for the multiple primary trees and the second tree;

performing concurrent traversal of the multiple primary trees and the second tree, level-by-level, to accelerate database operation, wherein the multiple primary trees are disjoint;

building respective sortable labels for traversed nodes of the multiple primary trees by concatenating sortable labels of respective parent nodes of the traversed nodes with respective labels of the traversed nodes;

aggregating data of the traversed nodes of the multiple primary trees, over a plurality of traversed levels, into an output data structure; and returning the output data structure in response to the request.

14. The method of claim 13, further comprising:
sorting the output data structure according to the sortable labels of the traversed nodes;
based on the sorting, reconstructing tree-organized data structures of the traversed nodes.

15. The method of claim 13, wherein the acquiring data comprises receiving a stream of updates.

\* \* \* \* \*